(12) United States Patent
Lin et al.

(10) Patent No.: US 9,892,224 B2
(45) Date of Patent: Feb. 13, 2018

(54) METHOD OF FORMING MASKS

(71) Applicant: TAIWAN SEMICONDUCTOR MANUFACTURING COMPANY, LTD., Hsinchu (TW)

(72) Inventors: Yi-Hsiung Lin, Hsinchu (TW); Ta-Pen Guo, Taipei (TW); Yi-Hsun Chiu, Zhubei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 14/995,413

(22) Filed: Jan. 14, 2016

(65) Prior Publication Data

US 2016/0283631 A1 Sep. 29, 2016

Related U.S. Application Data

(60) Provisional application No. 62/115,454, filed on Feb. 12, 2015.

(51) Int. Cl.
| | |
|---|---|
| *H01L 29/40* | (2006.01) |
| *G06F 17/50* | (2006.01) |
| *H01L 21/027* | (2006.01) |
| *H01L 21/768* | (2006.01) |
| *H01L 23/522* | (2006.01) |
| *H01L 23/528* | (2006.01) |

(52) U.S. Cl.
CPC .......... *G06F 17/5068* (2013.01); *G06F 17/50* (2013.01); *H01L 21/027* (2013.01); *H01L 21/76816* (2013.01); *H01L 23/528* (2013.01); *H01L 23/5226* (2013.01); *G06F 2217/12* (2013.01)

(58) Field of Classification Search
CPC .. G06F 17/5068; G06F 17/50; G06F 2217/12; H01L 21/76816; H01L 23/5226; H01L 23/528; H01L 21/027
USPC ........................................................ 257/774
See application file for complete search history.

(56) References Cited

U.S. PATENT DOCUMENTS

| 5,610,831 A | 3/1997 | Matsumoto |
|---|---|---|
| 8,421,205 B2 | 4/2013 | Yang |

(Continued)

FOREIGN PATENT DOCUMENTS

| JP | 2006253409 A | 9/2006 |
|---|---|---|
| JP | 2010021187 A | 1/2010 |
| KR | 100190182 B1 | 6/1999 |

*Primary Examiner* — Vu A Vu
(74) *Attorney, Agent, or Firm* — Slater Matsil, LLP

(57) ABSTRACT

A method of forming a set of masks for manufacturing an integrated circuit includes determining a presence of a first via layout pattern and a power rail layout pattern in an original layout design. The first via layout pattern and the power rail layout pattern overlap each other. The first via layout pattern is part of a first cell layout of the original layout design. The power rail layout pattern is shared by the first cell layout and a second cell layout of the original layout design. The method further includes modifying the original layout design to become a modified layout design and forming the set of masks based on the modified layout design. The modifying the original layout design includes, if the first via layout pattern and the power rail are present in the original layout design, replacing the first via layout pattern with an enlarged via layout pattern.

20 Claims, 14 Drawing Sheets

(56) References Cited

U.S. PATENT DOCUMENTS

| | | | |
|---|---|---|---|
| 8,601,416 B2 | 12/2013 | Kuo et al. | |
| 8,661,389 B2 | 2/2014 | Chern et al. | |
| 8,698,205 B2 | 4/2014 | Tzeng et al. | |
| 8,762,900 B2 | 6/2014 | Shin et al. | |
| 8,775,993 B2 | 7/2014 | Huang et al. | |
| 8,826,212 B2 | 9/2014 | Yeh et al. | |
| 8,836,141 B2 | 9/2014 | Chi et al. | |
| 8,887,116 B2 | 11/2014 | Ho et al. | |
| 2010/0037197 A1* | 2/2010 | Fukunaga | G06F 17/5068 716/126 |
| 2014/0101623 A1 | 4/2014 | Chen et al. | |
| 2014/0201692 A1 | 7/2014 | Chen et al. | |
| 2014/0215420 A1 | 7/2014 | Lin et al. | |
| 2014/0237435 A1 | 8/2014 | Chen et al. | |
| 2014/0252650 A1* | 9/2014 | Utsumi | H01L 23/5286 257/774 |
| 2014/0264924 A1 | 9/2014 | Yu et al. | |
| 2014/0282289 A1 | 9/2014 | Hsu et al. | |
| 2014/0282337 A1 | 9/2014 | Yuh et al. | |
| 2014/0304670 A1 | 10/2014 | Su et al. | |
| 2014/0310675 A1 | 10/2014 | Liu et al. | |
| 2014/0325464 A1 | 10/2014 | Hsu et al. | |
| 2014/0325466 A1 | 10/2014 | Ke et al. | |

* cited by examiner

METHOD OF FORMING MASKS

BACKGROUND

An integrated circuit (IC) is fabricated according to a layout design usable to form a plurality of masks for selectively forming or removing various layers of features, such as active regions, gate electrodes, various layers of isolation structures, and/or various layers of conductive structures. Many fabrication processes are available to increase the spatial resolution of various layers of features and thus allow layout patterns to have a finer spatial resolution in a corresponding layout. However, many of the fabrication processes for increasing the spatial resolution of features are performed at the expense of increased complexity and resources, such as additional masks, additional exposure processes, and/or additional etching processes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
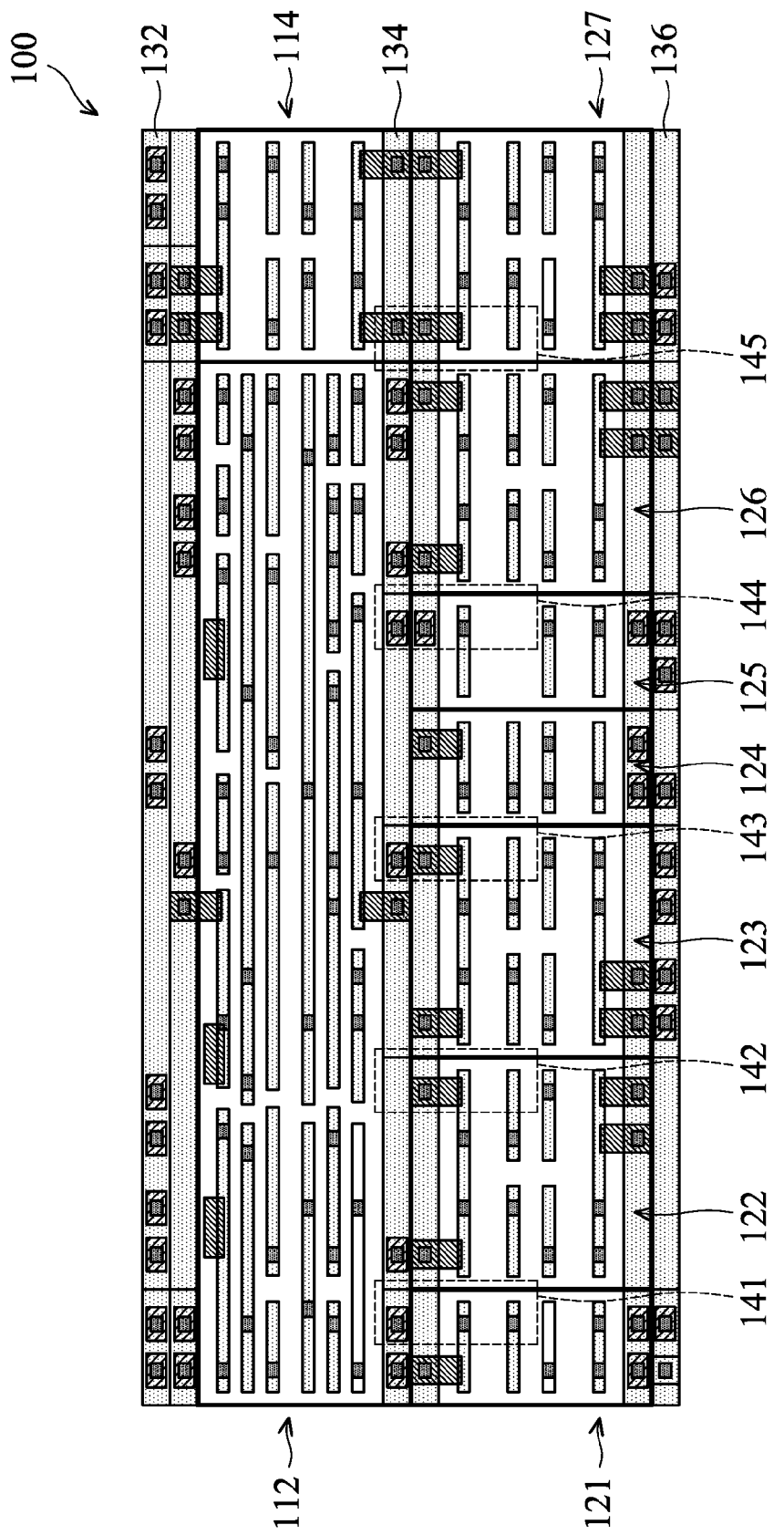
FIG. 1 is a portion of a layout diagram of an integrated circuit, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments of the present disclosure, an original layout design is reviewed and modified to decrease the spatial resolution of some of the layout patterns of the original layout design. In some embodiments, the original layout design is reviewed to determine the presence of one or more predetermined layout scenarios. In response to the presence of one or more of the predetermined layout scenarios, one or more corresponding via layout patterns are replaced by an enlarged via layout pattern. As a result, the electrical resistance of the resulting via plug based on the enlarged via layout pattern is reduced. In some embodiments, the number of masks that is used for forming the corresponding via plug layer is reduced. In some embodiments, compared with the resulting integrated circuit based on the original layout design, the operational frequency of the resulting integrated circuit based on the modified layout design is about 4~5% improved, and the fabrication process of forming the via plug layer is simplified from performing 7-patterning-7-etching (7P7E) to 5P5E.

FIG. 1 is a portion 100 of a layout diagram of a layout design usable for fabricating an integrated circuit, in accordance with some embodiments. When designing the integrated circuit, in some embodiments, standard cells having predetermined functions are used. The portion 100 of the layout design includes the layout patterns corresponding to various standard cells occupying areas surrounded by corresponding cell boundaries depicted as various bold lines 110. The layout patterns corresponding to various standard cells are referred to in this disclosure as standard cell layouts 112, 114, 121, 122, 123, 124, 125, 126, and 127. Each of cell layouts 112, 114, 121, 122, 123, 124, 125, 126, and 127 includes a plurality of layout patterns corresponding to forming transistors and interconnection structures over the corresponding transistors. In some embodiments, the interconnection structures include various via plugs and conductive lines. Moreover, the portion 100 of the layout design includes layout patterns corresponding to other standard cells (not labeled) abutting standard cell layouts 112, 114, 121, 122, 123, 124, 125, 126, or 127. In FIG. 1, some details of the standard cell layouts and some layout patterns corresponding to various conductive lines are omitted.

The integrated circuit fabricated based on the layout design depicted in FIG. 1 includes transistors having channel structures extending along a direction perpendicular to an upper surface of a substrate and various conductive lines and surrounding the corresponding gate structures. This type of transistors is sometimes known as vertical oxide diffusion (OD) transistors. Vertical OD transistors are used as examples in the present disclosure. Various layout scenarios and the corresponding via layout pattern modification schemes illustrated in the present disclosure are also applicable to layout designs for fabricating other types of transistors, including, for example, planar OD transistors or various types of Fin-FET devices.

In some embodiments, one or more of the standard cells are logic gate cells. In some embodiments, logic gate cells include AND, OR, NAND, NOR, XOR, INV, AND-OR-Invert (AOI), OR-AND-Invert (OAI), MUX, Flip-flop, BUFF, Latch, delay, clock cells, or other types of logic gate cells.

The portion 100 of the layout design further includes power rail layout patterns 132, 134, and 136, which, in some embodiments, extend along cell boundaries (not labeled) and have various portions thereof within corresponding cell layouts sharing the cell boundaries. In this disclosure, power rail layout patterns 132, 134, and 136 are described as being shared by corresponding, abutted cell layouts. Each of cell layouts 112, 114, 121, 122, 123, 124, 125, 126, and 127 includes a plurality of via layout patterns VD overlapping corresponding power rail layout patterns 132, 134, and 136. In the resulting integrated circuit, via layout patterns VD correspond to forming via plugs in one or more different via plug layers of the integrated circuit. Further, power rail layout patterns 132, 134, and 136 correspond to conductive lines in a conductive layer of the integrated circuit above the one or more different via plug layers. In some embodiments, the conductive layer is immediately above the one or more different via plug layers. In a resulting integrated circuit, conductive lines corresponding to power rail layout patterns 132, 134, and 136 are configured to carry one or more operational voltages and/or a reference ground voltage. As such, standard cells corresponding to cell layouts 112, 114, 121, 122, 123, 124, 125, 126, and 127 receive the one or more operational voltages or the reference ground voltage from the conductive lines corresponding to power rail layout patterns 132, 134, or 136 and through various via plugs corresponding to via layout patterns VD.

In some embodiments, layouts 112, 114, 121, 122, 123, 124, 125, 126, and 127 are designed and stored in a cell library before the cell layouts are loaded and placed to form a layout design. Therefore, the layout patterns of cell layouts 112, 114, 121, 122, 123, 124, 125, 126, and 127 are usually arranged to accommodate a variety of possible placement or abutment arrangements. Nevertheless, once the cell layouts 112, 114, 121, 122, 123, 124, 125, 126, and 127 are placed in a layout design, some layout patterns adjacent to the cell boundaries are further modified to simplify the subsequent fabrication processes by lowering the spatial resolution of various layout patterns. Five example layout scenarios where further layout pattern modifications are justifiable are identified in FIG. 1 as regions 141, 142, 143, 144, and 145 and are further illustrated in conjunction with FIGS. 2A-6D. Other modifications are within the contemplated scope of the present disclosure.

Figure 8:
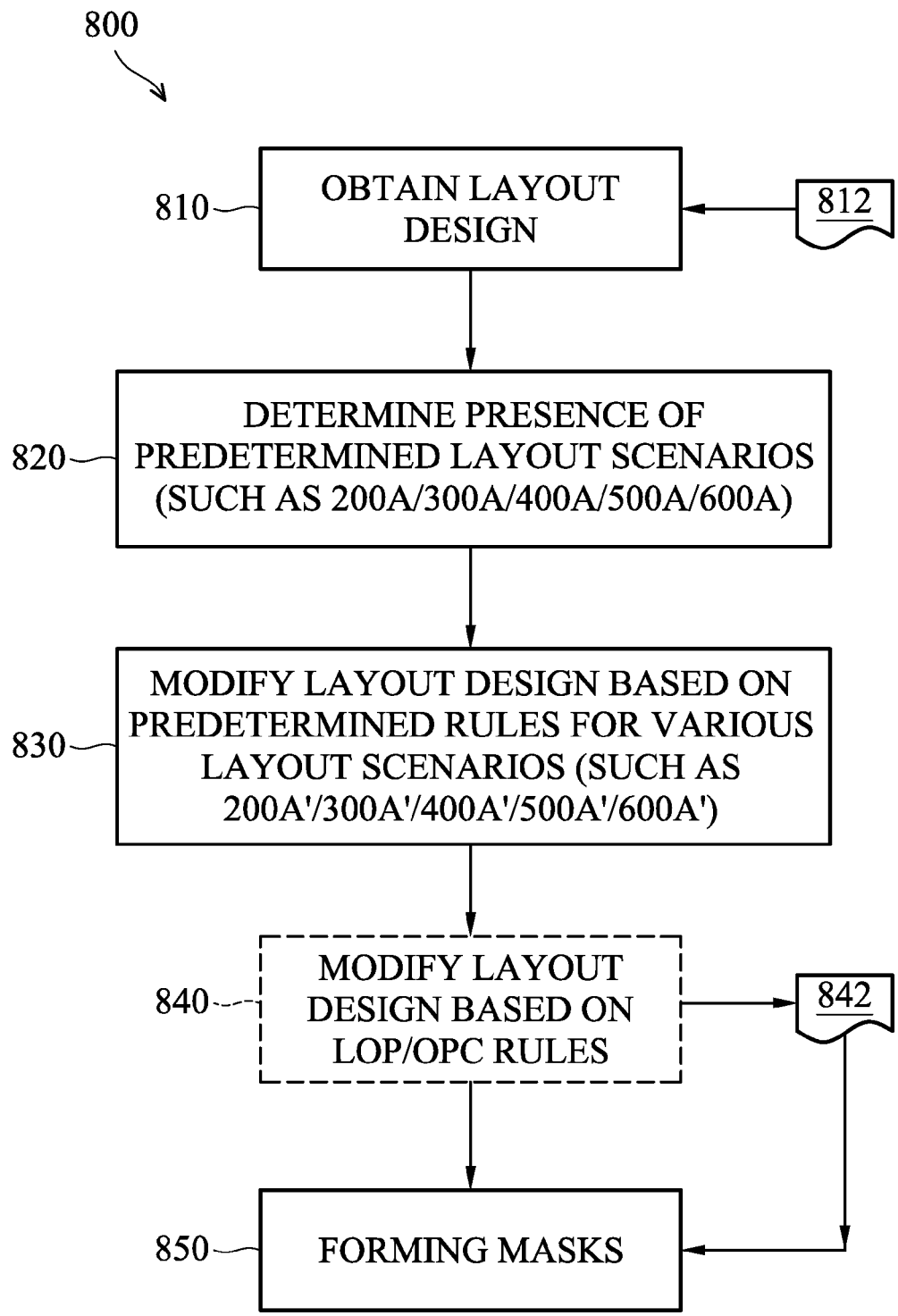
FIG. 8 is a flow chart of a method of forming a set of masks for manufacturing an integrated circuit, in accordance with some embodiments.

FIG. 8 is a flow chart of a method 800 of forming a set of masks for manufacturing an integrated circuit in accordance with some embodiments. In some embodiments, the set of masks described in method 800 are manufactured based on a modified layout design as illustrated in conjunction with FIGS. 2A-6D. Other methods for forming the set of masks based on the modified layout design illustrated in conjunction with FIGS. 2A-6D and/or other modified layout design are within the contemplated scope of the present disclosure.

Figure 2A:
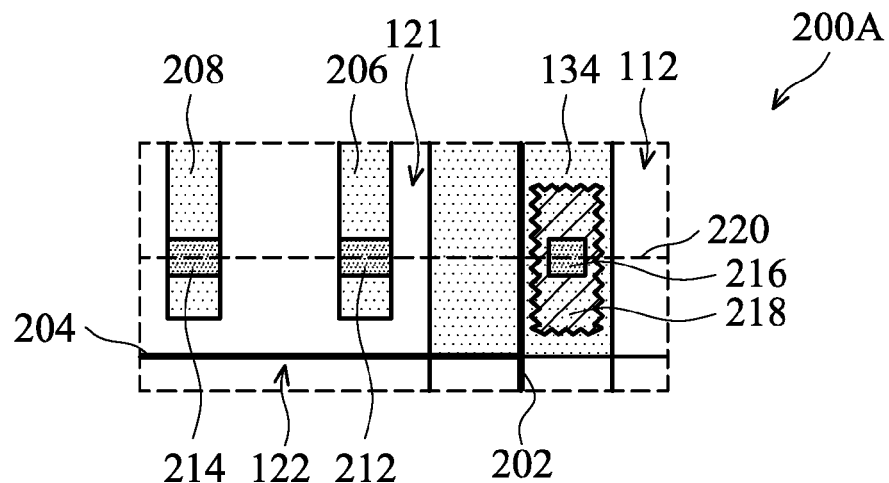
FIGS. 2A, 3A, 4A, 5A, and 6A are layout diagrams of various example scenarios in an original layout design, in accordance with some embodiments.

FIG. 2A is an enlarged layout diagram depicting a portion 200A of an original layout design corresponding to region 141 of FIG. 1, rotated by 90 degrees clockwise, in accordance with some embodiments. Components in FIG. 2A that are the same or similar to those in FIG. 1 are given the same reference numbers, and detailed description thereof is thus omitted.

The portion 200A depicts portions of cell layouts 112, 121, and 122, a cell boundary 202 dividing cell layouts 112 and 121 and cell layouts 112 and 122, and a cell boundary 204 dividing cell layouts 121 and 122. Power rail layout pattern 134 extends along cell boundary 202 and having various portions thereof within cell layouts 112, 121, and 122 (i.e., shared by cell layouts 112 and 121 and by cell layouts 112 and 122).

Cell layout 121 includes conductive layout patterns 206 and 208 and via layout patterns 212 and 214. Conductive layout pattern 206 overlaps via layout pattern 212, and conductive layout pattern 208 overlaps via layout pattern 214. Conductive layout patterns 206 and 208 and power rail layout pattern 134 correspond to forming conductive features in a first conductive layer of the integrated circuit. Via layout pattern 212 corresponds to forming a via plug in a first via plug layer. In some embodiments, the first via plug layer includes via plugs usable to connect a drain pad layer and the first conductive layer of the integrated circuit. Another via plug layer connecting other layers of the integrated circuit is within the contemplated scope of the present disclosure. Via layout pattern 214 corresponds to forming a via plug in a second via plug layer. In some embodiments, the second via plug layer includes via plugs usable to connect a metal-zero layer over polysilicon ("M0PO" or "MP") and the first conductive layer of the integrated circuit. Another via plug layer connecting other layers of the integrated circuit is within the contemplated scope of the present disclosure.

Cell layout 112 includes a via layout pattern 216 and a conductive layout 218. Via layout pattern 216, conductive layout 218, and power rail layout pattern 134 overlap one another. Conductive layout 218 corresponds to forming a first type metal-zero layer over oxide-definition areas ("M0OD-1" or "MD1") structure of the integrated circuit. Via layout pattern 216 corresponds to forming a via plug in a third via plug layer, where the third via plug layer includes via plugs usable to connect the MD1 structures and the first conductive layer of the integrated circuit. Other details of cell layouts 112, 121, and 122 are omitted. In some embodiments, via layout patterns 212, 214, and 216 have the same dimension.

Figure 2B:
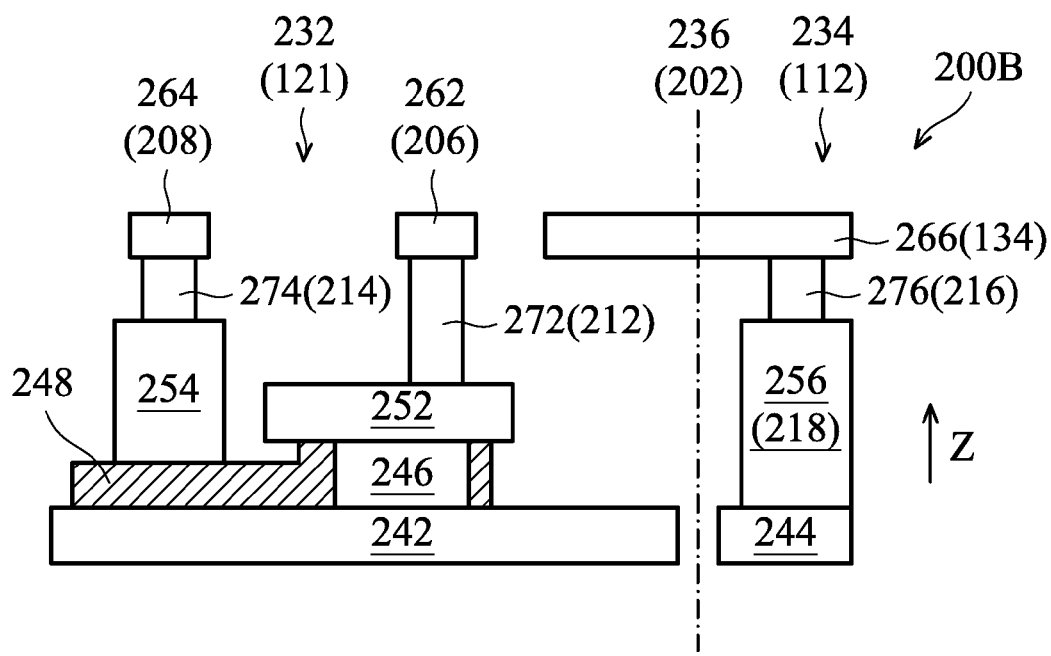
FIGS. 2B, 3B, 4B, 5B, and 6B are cross-sectional views of portions of an integrated circuit manufactured based on the original layout design, where each of the cross-sectional views correspond to the various scenarios in FIGS. 2A, 3A, 4A, 5A, and 6A, in accordance with some embodiments.

FIG. 2B is a cross-sectional view of a portion 200B of an integrated circuit manufactured based on the original layout design in accordance with some embodiments. The portion 200B is taken along a reference line corresponding to reference line 220 in FIG. 2A. In FIG. 2B, the reference numbers in the parentheses indicate the corresponding counterparts in FIG. 2A. Some details of the portion 200B of the integrated circuit are omitted.

The portion 200B includes a region 232 corresponding to cell layout 121 and a region 234 corresponding to cell layout 112 in FIG. 2A. Reference line 236 indicates the position corresponding to cell boundary 202. The portion 200B includes a first source pad 242 in region 232, a second source pad 244 in region 234, a channel structure 246 over first source pad 242, a gate structure 248 over first source pad 242 and surrounding channel structure 246, a drain pad 252 over channel structure 246, an MP structure 254 over gate structure 248, and an MD1 structure 256 over second source pad 244.

Moreover, the portion 200B includes conductive structures 262, 264, and 266 and via plugs 272, 274, and 276. Conductive structure 262 is fabricated based on conductive layout pattern 206 in FIG. 2A; conductive structure 264 is fabricated based on conductive layout pattern 208; and conductive structure 266 is part of a power rail fabricated based on power rail layout pattern 134. Via plug 272 is fabricated based on via layout pattern 212; via plug 274 is fabricated based on via layout pattern 214; and via plug 276 is fabricated based on via layout pattern 216. Conductive structure 266 is in contact with via plug 276 and free from contacting via plugs 272 and 274.

In some embodiments, the size of via layout pattern 216 is limited by the position and the size of a nearest via layout pattern of the same layout layer to the extent that a minimum spacing layout rule of such layout layer is not violated. To accommodate a variety of possible placement or abutment arrangements, via layout pattern 216 is placed away from cell boundary 202 sufficient to guarantee compliance of the minimum spacing layout rule regardless of the possible cell layout on either side of cell boundary 202. As depicted in FIG. 2A and FIG. 2B, cell layouts 112 and 121 are arranged to have the presence of a via layout pattern 216 on the side of cell boundary 202 within cell layout 112 and are further arranged lacking a counterpart via layout pattern overlapping power rail layout pattern 134 on the other side of cell boundary 202 within cell layout 121. For via layout pattern 216 after the placement of cell layouts 112 and 121 is determined, the absence of a counterpart via layout pattern on the other side of cell boundary 202 allows additional sufficient space in the layout design for enlarging via layout pattern 216 without violating the minimum spacing layout rule between via layout pattern 216 and any other layout pattern of the same layout layer. An enlarged via layout pattern (such as a via layout pattern 282 in FIG. 2C) corresponds to an enlarged via plug (such as a via plug 286 in FIG. 2D) occupying a greater area and having less electrical resistance along a vertical direction Z.

Figure 2C:
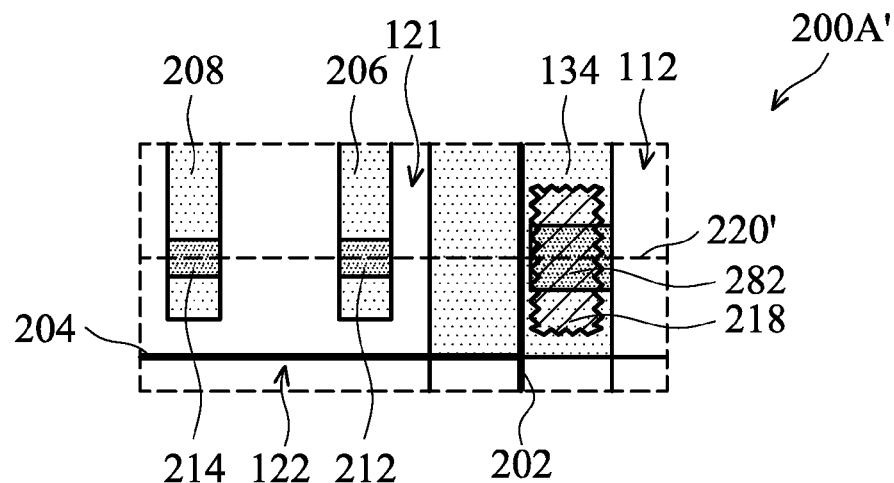
FIGS. 2C, 3C, 4C, 5C, and 6C are layout diagrams of a modified layout design based on the various scenarios in FIGS. 2A, 3A, 4A, 5A, and 6A, in accordance with some embodiments.

FIG. 2C is a layout diagram of a portion 200A' of a modified layout design based on the scenario depicted in FIG. 2A, in accordance with some embodiments. Components in FIG. 2C that are the same or similar to those in FIG. 2A are given the same reference numbers.

Compared with portion 200A in FIG. 2A, via layout pattern 216 is replaced with an enlarged via layout pattern 282 in portion 200A'. Via layout pattern 282 corresponds to forming a via plug in the third via plug layer.

Figure 2D:
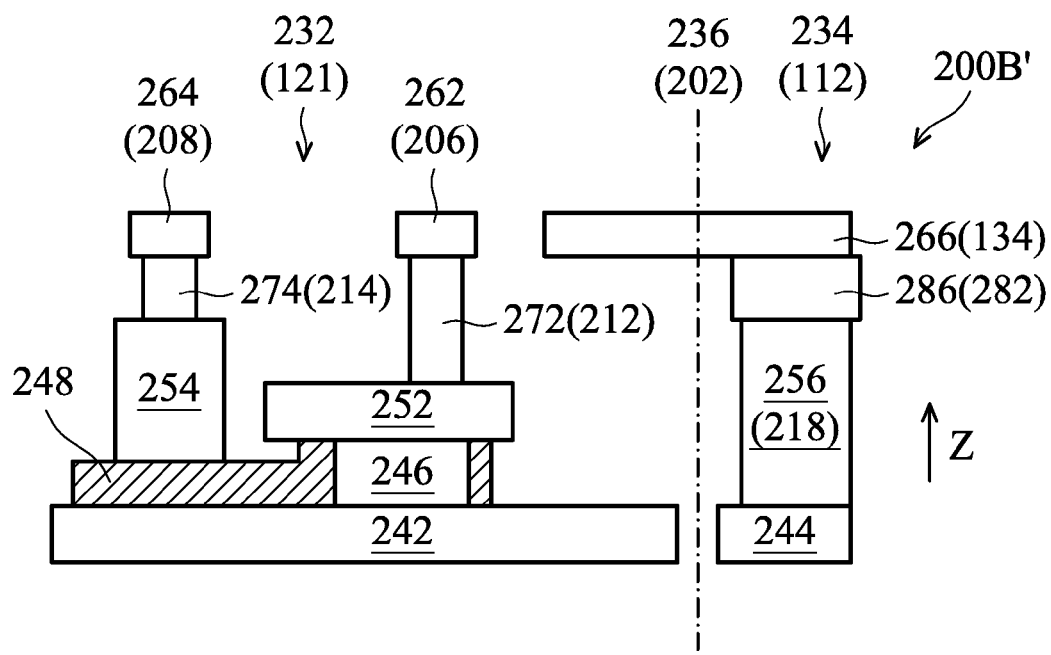
FIGS. 2D, 3D, 4D, 5D, and 6D are cross-sectional views of portions of an integrated circuit manufactured based on the modified layout design, where each of the cross-sectional views correspond to the various scenarios in FIGS. 2C, 3C, 4C, 5C, and 6C, in accordance with some embodiments.

FIG. 2D is a cross-sectional view of a portion 200B' of an integrated circuit manufactured based on the modified layout design. The portion 200B' is taken along a reference line corresponding to reference line 220' in FIG. 2C. In FIG. 2D, the reference numbers in the parentheses indicate the corresponding counterparts in FIG. 2C. Some details of the portion 200B' of the integrated circuit are omitted. Components in FIG. 2D that are the same or similar to those in FIG. 2B are given the same reference numbers.

Compared with portion 200B in FIG. 2B, portion 200B' includes via plug 286 in place of via plug 276. Via plug 286 is fabricated based on enlarged via layout pattern 282 in FIG. 2C and connects MD1 structure 256 and conductive structure 266, which is usable as a portion of a power rail. Conductive structure 266 is free from contacting via plugs 272 and 274. Also, via plug 286 occupies a greater area than via plug 276. As a result, via plug 286 has less electrical resistance along vertical direction Z than that of via plug 276.

Figure 3A:
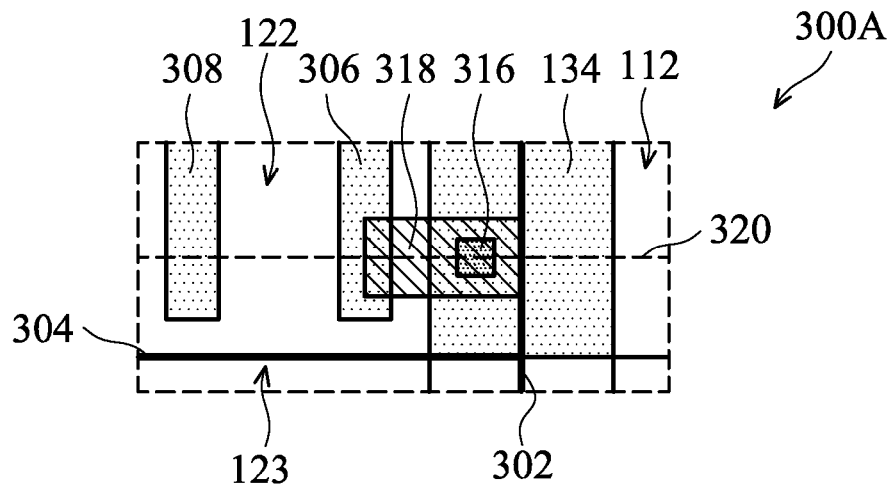

FIG. 3A is an enlarged layout diagram depicting a portion 300A of the original layout design corresponding to region 142 of FIG. 1, rotated by 90 degrees clockwise, in accordance with some embodiments. Components in FIG. 3A that are the same or similar to those in FIG. 1 are given the same reference numbers, and detailed description thereof is thus omitted.

The portion 300A depicts portions of cell layouts 112, 122, and 123, a cell boundary 302 dividing cell layouts 112 and 122 and cell layouts 112 and 123, and a cell boundary 304 dividing cell layouts 122 and 123. Power rail layout pattern 134 extends along cell boundary 302 and having various portions thereof within cell layouts 112, 122, and 123 (i.e., shared by cell layouts 112 and 122 and by cell layouts 112 and 123).

Cell layout 122 includes conductive layout patterns 306 and 308, a via layout pattern 316, and a conductive layout pattern 318. Via layout pattern 316 overlaps power rail layout pattern 134. Conductive layout pattern 318 overlaps at least via layout pattern 316 and power rail layout pattern 134. Conductive layout patterns 306 and 308 and power rail layout pattern 134 correspond to forming conductive features in the first conductive layer of the integrated circuit.

Conductive layout 318 corresponds to forming a second type metal-zero layer over oxide-definition areas ("M0OD-2" or "MD2") structure of the integrated circuit. In some embodiments, a MD2 structure (such as MD2 structure 354 in FIG. 3B) has a lower surface level with an upper surface of a drain pad (such as drain pad 352 in FIG. 3B) and an upper surface level with an upper surface of a MD1 structure. Via layout pattern 316 corresponds to forming a via plug in a fourth via plug layer. In some embodiments, the fourth via plug layer includes via plugs usable to connect the MD2 structures and the first conductive layer of the integrated circuit. Other details of cell layouts 112, 122, and 123 are omitted. Other layers connecting other structures of the integrated circuit are within the scope of the present disclosure.

Figure 3B:
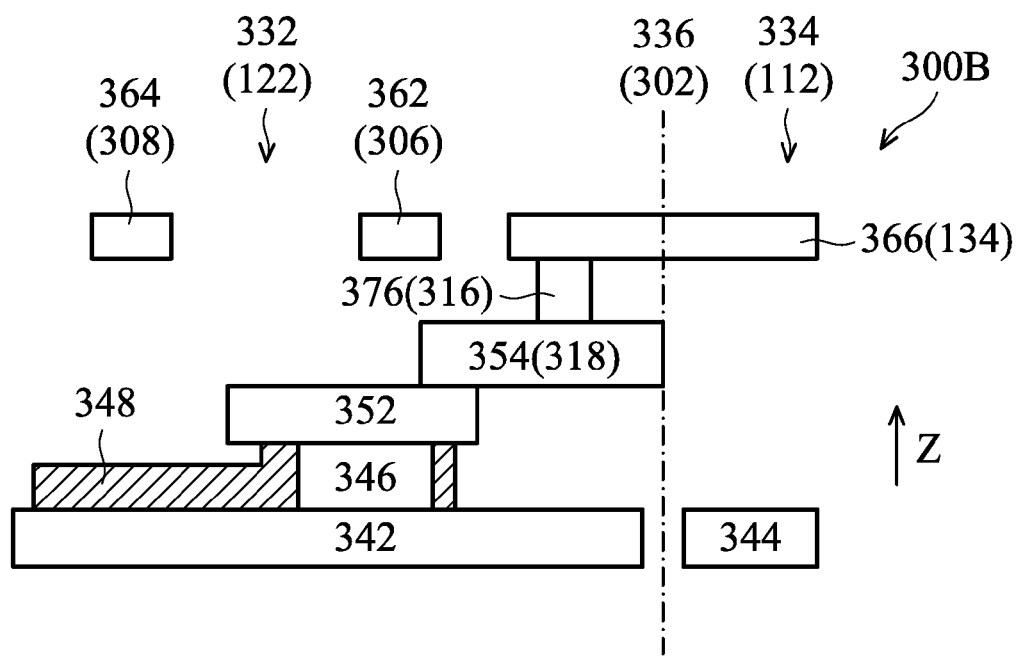

FIG. 3B is a cross-sectional view of a portion 300B of the integrated circuit manufactured based on the original layout design in accordance with some embodiments. The portion 300B is taken along a reference line corresponding to reference line 320 in FIG. 3A. In FIG. 3B, the reference numbers in the parentheses indicate the corresponding counterparts in FIG. 3A. Some details of the portion 300B are omitted.

The portion 300B includes a region 332 corresponding to cell layout 122 and a region 334 corresponding to cell layout 112 in FIG. 3A. Reference line 336 indicates the position corresponding to cell boundary 302. The portion 300B includes a first source pad 342 corresponding to source pad 242 in FIG. 2B, a second source pad 344 corresponding to source pad 244, a channel structure 346 corresponding to channel structure 246, a gate structure 348 corresponding to gate structure 248, and a drain pad 352 corresponding to drain pad 252. Detailed description thereof is thus omitted.

The portion 300B further includes a MD2 structure 354, conductive structures 362, 364, and 366, and a via plug 376. MD2 structure 354 is fabricated based on conductive layout pattern 318 in FIG. 3A. Conductive structure 362 is fabricated based on conductive layout pattern 306; conductive structure 364 is fabricated based on conductive layout pattern 308; and conductive structure 366 is part of the power rail fabricated based on power rail layout pattern 134.

MD2 structure 354 is configured to electrically bridge drain pad 352 to a position directly under conductive structure 366. Via plug 376 is fabricated based on via layout pattern 316. Via plug 376 connects MD2 structure 354 with conductive structure 366.

In some embodiments, the size of via layout pattern 316 is limited by the position and the size of a nearest via layout pattern of the same layout layer to the extent that a minimum spacing layout rule of such layout layer is not violated. To accommodate a variety of possible placement or abutment arrangements, via layout pattern 316 is placed away from cell boundary 302 sufficient to guarantee compliance of the minimum spacing layout rule regardless of the possible cell layout on either side of cell boundary 302. As depicted in FIG. 3A and FIG. 3B, cell layouts 112 and 122 are arranged to have the presence of a via layout pattern 316 on the side of cell boundary 302 within cell layout 122 and are further arranged without a counterpart via layout pattern overlapping power rail layout pattern 134 on the other side of cell boundary 302 within cell layout 112. For via layout pattern 316 after the placement of cell layouts 112 and 121 is determined, the absence of a counterpart via layout pattern on the other side of cell boundary 302 allows additional sufficient space in the layout design for enlarging via layout pattern 316 without violating the minimum spacing layout rule between via layout pattern 316 and any other layout pattern of the same layout layer. An enlarged via layout pattern (such as a via layout pattern 382 in FIG. 3C) corresponds to an enlarged via plug (such as a via plug 386 in FIG. 3D) occupying a greater area and having less electrical resistance along a vertical direction Z.

Figure 3C:
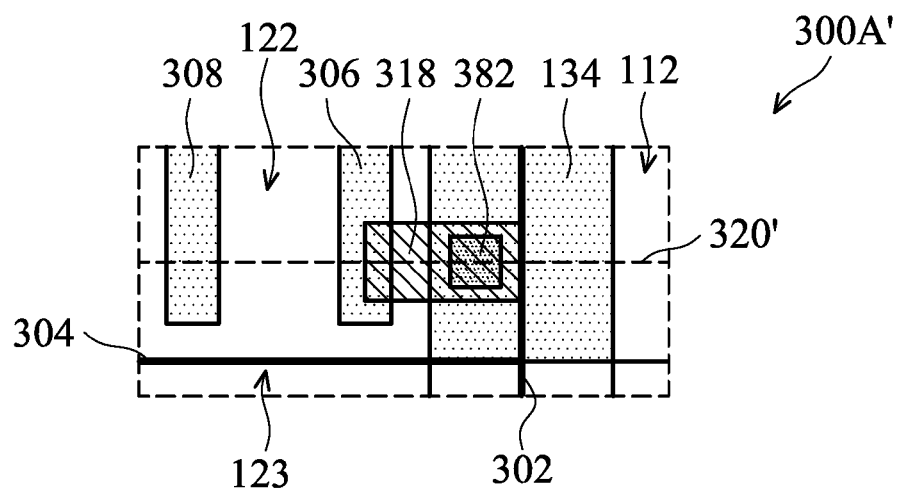

FIG. 3C is a layout diagram of a portion 300A' of the modified layout design based on the scenario depicted in FIG. 3A in accordance with some embodiments. Components in FIG. 3C that are the same or similar to those in FIG. 3A are given the same reference numbers.

Compared with portion 300A in FIG. 3A, via layout pattern 316 is replaced with an enlarged via layout pattern 382 in portion 300A'. In some embodiments, via layout pattern 382 corresponds to forming a via plug in the fourth via plug layer. In some embodiments, via layout pattern 382 is grouped with other via layout patterns for forming via plugs in the third via plug layer.

Figure 3D:
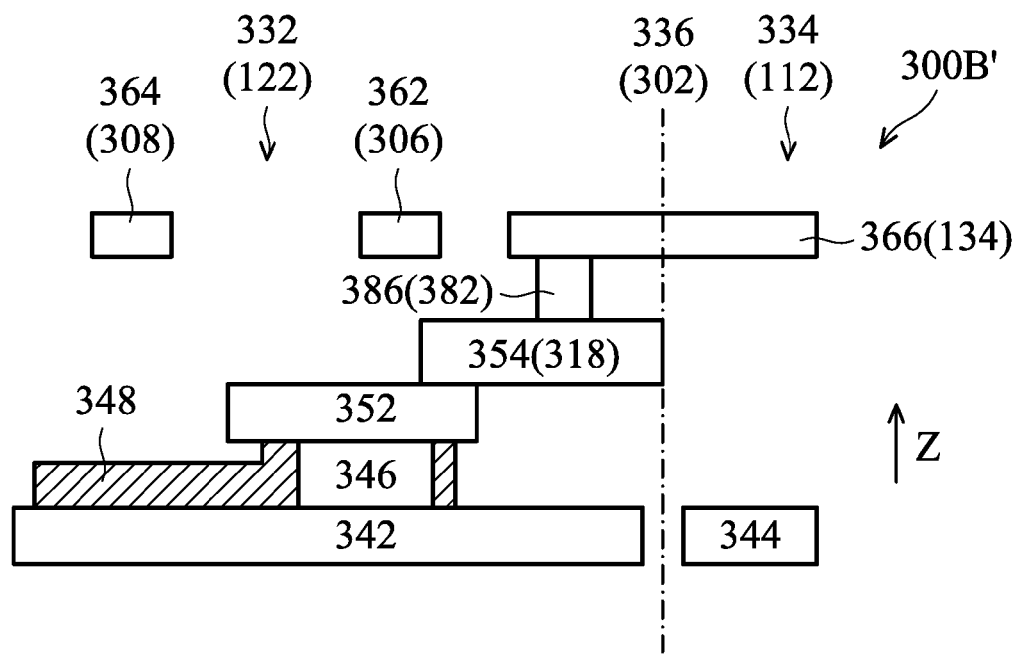

FIG. 3D is a cross-sectional view of a portion 300B' of the integrated circuit manufactured based on the modified layout design. The portion 300B' is taken along a reference line corresponding to reference line 320' in FIG. 3C. In FIG. 3D, the reference numbers in the parentheses indicate the corresponding counterparts in FIG. 3C. Some details of the portion 300B' of the integrated circuit are omitted. Components in FIG. 3D that are the same or similar to those in FIG. 3B are given the same reference numbers.

Compared with portion 300B in FIG. 3B, portion 300B' includes via plug 386 in place of via plug 376. Via plug 386 is fabricated based on via layout pattern 382 in FIG. 3C and connects MD2 structure 354 and conductive structure 366. Also, via plug 386 occupies a greater area than via plug 376. As a result, via plug 386 has less electrical resistance along vertical direction Z than that of via plug 376.

Figure 4A:
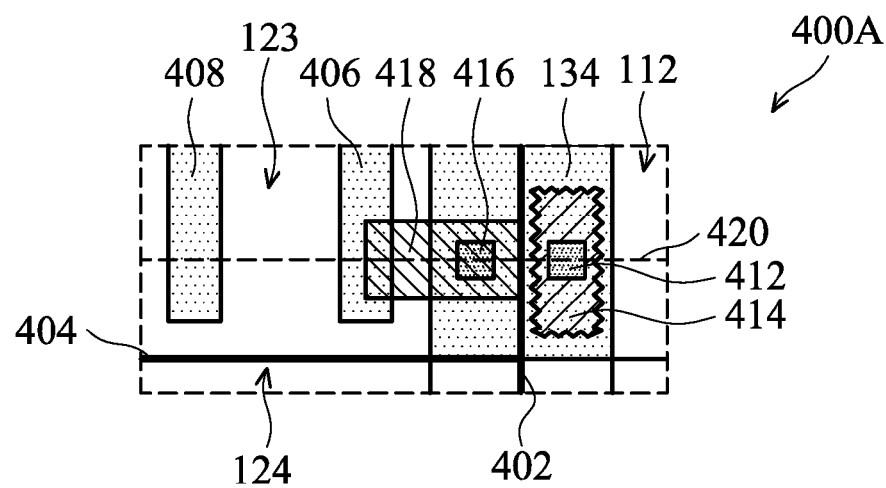

FIG. 4A is an enlarged layout diagram depicting a portion 400A of the original layout design corresponding to region 143 of FIG. 1, rotated by 90 degrees clockwise, in accordance with some embodiments. Components in FIG. 4A that are the same or similar to those in FIG. 1 are given the same reference numbers, and detailed description thereof is thus omitted.

The portion 400A depicts portions of cell layouts 112, 123, and 124, a cell boundary 402 dividing cell layouts 112 and 123 and cell layouts 112 and 124, and a cell boundary 404 dividing cell layouts 123 and 124. Power rail layout pattern 134 extends along cell boundary 402 and having various portions thereof within cell layouts 112, 123, and 124 (i.e., shared by cell layouts 112 and 123 and by cell layouts 112 and 124).

Cell layout 112 includes a via layout pattern 412 and a conductive layout pattern 414. Via layout pattern 412, conductive layout pattern 414, and power rail layout pattern 134 overlap one another. Conductive layout pattern 414 corresponds to forming a MD1 structure of the integrated circuit. Via layout pattern 412 corresponds to forming a via plug in the third via plug layer. Cell layout 123 includes conductive layout patterns 406 and 408, a via layout pattern 416, and a conductive layout pattern 418. Via layout pattern 416 overlaps power rail layout pattern 134. Via layout pattern 416 corresponds to forming a via plug in the fourth via plug layer. Conductive layout pattern 418 overlaps at least via layout pattern 416 and power rail layout pattern 134. Conductive layout patterns 406 and 408 and power rail layout pattern 134 correspond to forming conductive features in the first conductive layer of the integrated circuit. Via layout patterns 412 and 416 are aligned along a reference line 420 perpendicular to cell boundary 402. Conductive layout patterns 414 and 418 are also aligned along reference line 420.

Other details of cell layouts 112, 123, and 124 are omitted. In some embodiments, via layout patterns 412 and 416 have the same dimensions.

Figure 4B:
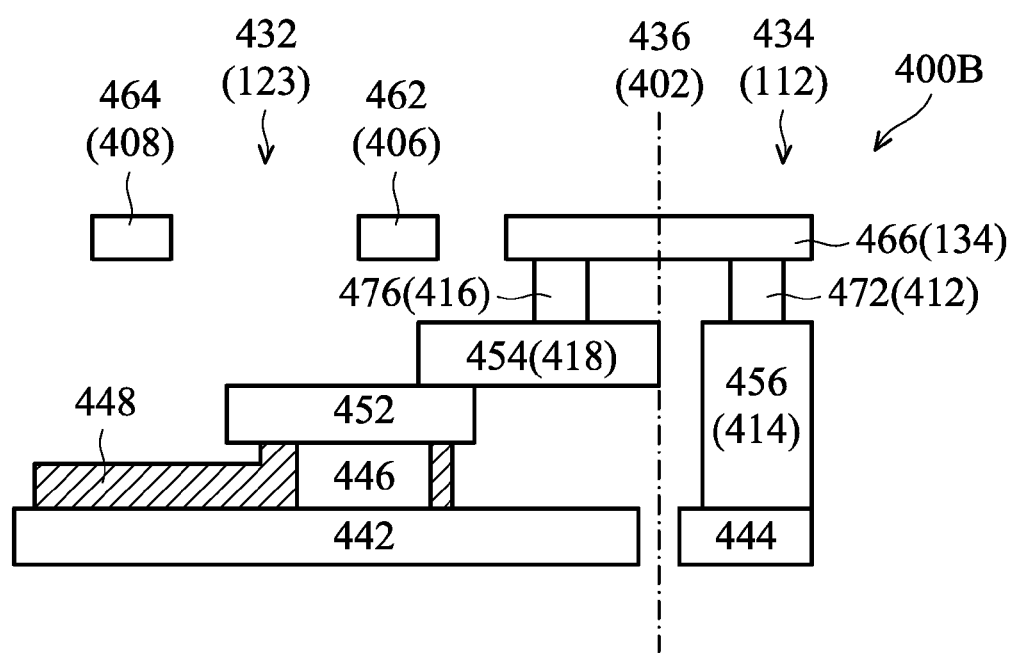

FIG. 4B is a cross-sectional view of a portion 400B of the integrated circuit manufactured based on the original layout design in accordance with some embodiments. The portion 400B is taken along a reference line corresponding to reference line 420 in FIG. 4A. In FIG. 4B, the reference numbers in the parentheses indicate the corresponding counterparts in FIG. 4A. Some details of the portion 400B of the integrated circuit are omitted.

The portion 400B includes a region 432 corresponding to cell layout 123 and a region 434 corresponding to cell layout 112 in FIG. 4A. Reference line 436 indicates the position corresponding to cell boundary 402. The portion 400B includes a first source pad 442 corresponding to source pad 242 in FIG. 2B, a second source pad 444 corresponding to source pad 244, a channel structure 446 corresponding to channel structure 246, a gate structure 448 corresponding to gate structure 248, and a drain pad 452 corresponding to drain pad 252. Detailed description thereof is thus omitted.

The portion 400B further includes a MD2 structure 454 in region 432, a MD1 structure 456 in region 434, conductive structures 462, 464, and 466, and a via plug 476. MD2 structure 454 is fabricated based on conductive layout pattern 418 in FIG. 4A, and MD1 structure 456 is fabricated based on conductive layout pattern 414. Conductive structure 462 is fabricated based on conductive layout pattern 406; conductive structure 464 is fabricated based on conductive layout pattern 408; and conductive structure 466 is part of the power rail fabricated based on power rail layout pattern 134. MD1 structure 456 and via plug 472 correspond to MD1 structure 256 and via plug 276 in FIG. 2B, and detailed description is thus omitted. MD2 structure 454 and via plug 476 correspond to MD2 structure 354 and via plug 376 in FIG. 3B, and detailed description is thus omitted.

To accommodate a variety of possible placement or abutment arrangements, layout patterns 412, 414, 416, and 418 are placed away from cell boundary 402 sufficient to guarantee compliance of the minimum spacing layout rule regardless of the possible cell layout on either side of cell boundary 402. As depicted in FIG. 4A and FIG. 4B, cell layouts 112 and 123 are arranged to have the presence of a via layout pattern 412 and conductive layout pattern 414 of cell layout 112 on one side of cell boundary 402 and a via layout pattern 416 and conductive layout pattern 418 of cell layout 123 on the other side of cell boundary 402. Conductive structures 466, 472, 456, 476, and 454 fabricated based on layout patterns 134, 412, 414, 416, and 418 are all electrically coupled with one another. After the placement of cell layouts 112 and 123 is determined, modifying layout patterns 412 or 416 to abut each other or modifying layout patterns 414 or 418 to abut each other does not alter the circuit schematic design. Therefore, in some embodiments, one or more of layout patterns 412, 414, 416, and 418 are merged or resized in order to replace via layout patterns 412 and 416 with an enlarged via layout pattern (such as a via layout pattern 484 in FIG. 4C). The enlarged via layout pattern 484 corresponds to an enlarged via plug (such as a via plug 488 in FIG. 4D) occupying a greater area than that of via plug 472 or via plug 476 .

Figure 4C:
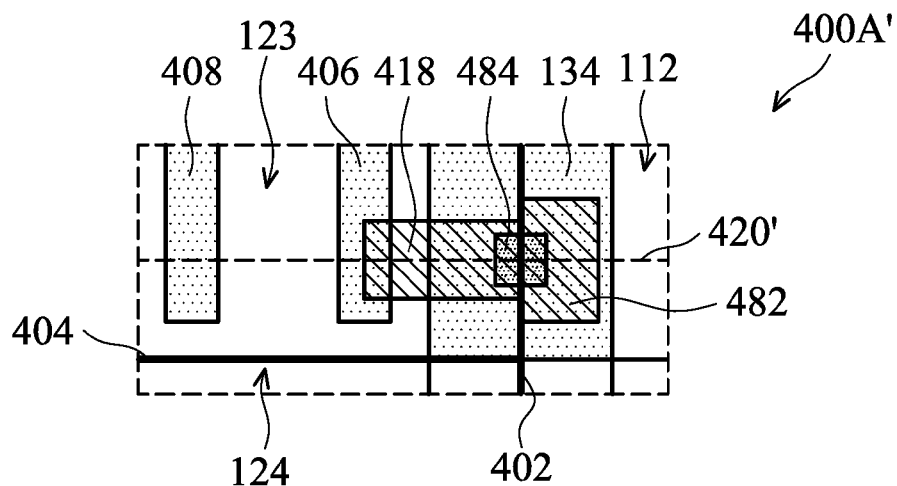

FIG. 4C is a layout diagram of a portion 400A' of the modified layout design based on the scenario depicted in FIG. 4A in accordance with some embodiments. Components in FIG. 4C that are the same or similar to those in FIG. 4A are given the same reference numbers.

Compared with portion 400A in FIG. 4A, conductive layout pattern 414 is replaced with a modified conductive layout pattern 482 in portion 400A'. In some embodiments, modified conductive layout pattern 482 is generated by reshaping or shifting conductive layout pattern 414 in FIG. 4A such that an edge of the modified conductive layout pattern 482 is shifted toward the cell boundary 402 or in contact with conductive layout pattern 418. Conductive layout patterns 482 and 418 are also aligned along a reference line 420' perpendicular to cell boundary 402.

Also, via layout patterns 412 and 416 in FIG. 4A are replaced with an enlarged via layout pattern 484. Enlarged via layout pattern 484 overlaps modified conductive layout pattern 482, conductive layout pattern 418, power rail layout pattern 134, and cell boundary 402. In some embodiments, via layout pattern 484 is grouped with other via layout patterns for forming via plugs in the third via plug layer.

Figure 4D:
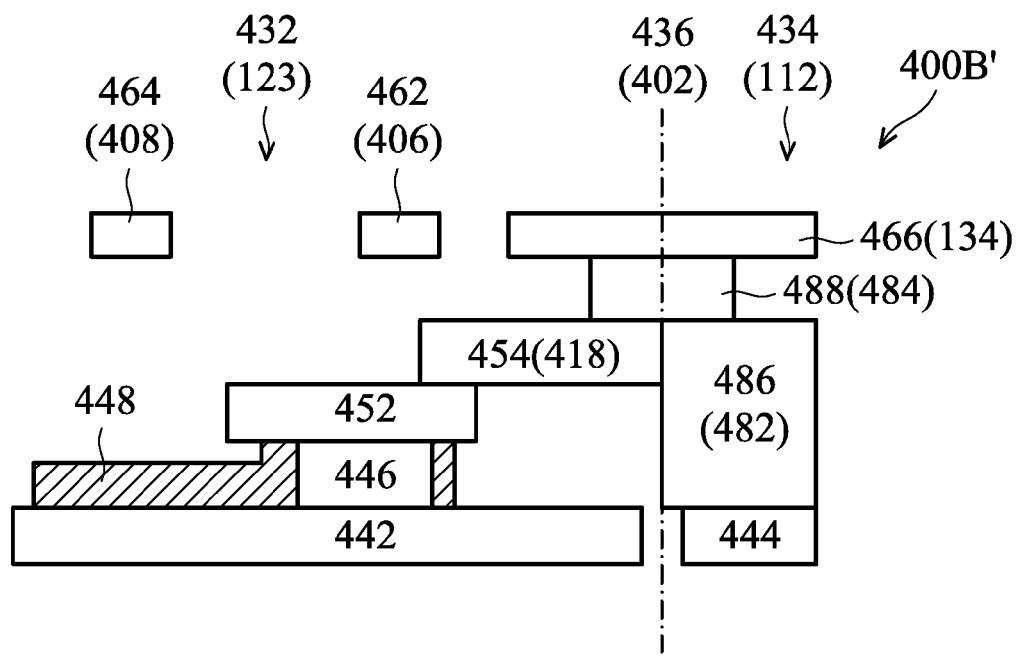

FIG. 4D is a cross-sectional view of a portion 400B' of the integrated circuit manufactured based on the modified layout design. The portion 400B' is taken along a reference line corresponding to reference line 420' in FIG. 4C. In FIG. 4D, the reference numbers in the parentheses indicate the corresponding counterparts in FIG. 4C. Some details of the portion 400B' of the integrated circuit are omitted. Components in FIG. 4D that are the same or similar to those in FIG. 4B are given the same reference numbers.

Compared with portion 400B in FIG. 4B, portion 400B' includes a MD1 structure 486 in place of MD1 structure 456 and via plug 488 in place of via plugs 472 and 476. MD1 structure 486 is fabricated based on conductive layout pattern 482 in FIG. 4A and is disposed to be in contact with MD2 structure 454. Via plug 488 is fabricated based on via layout pattern 484 in FIG. 4C and connects MD1 structure 486 and MD2 structure 454 with conductive structure 466. Also, via plug 488 occupies a greater area than via plug 472 or via plug 476, or a combination of via plugs 472 and 476. As a result, via plug 488 has less electrical resistance along vertical direction Z than that of via plug 472 or via plug 476.

Figure 5A:
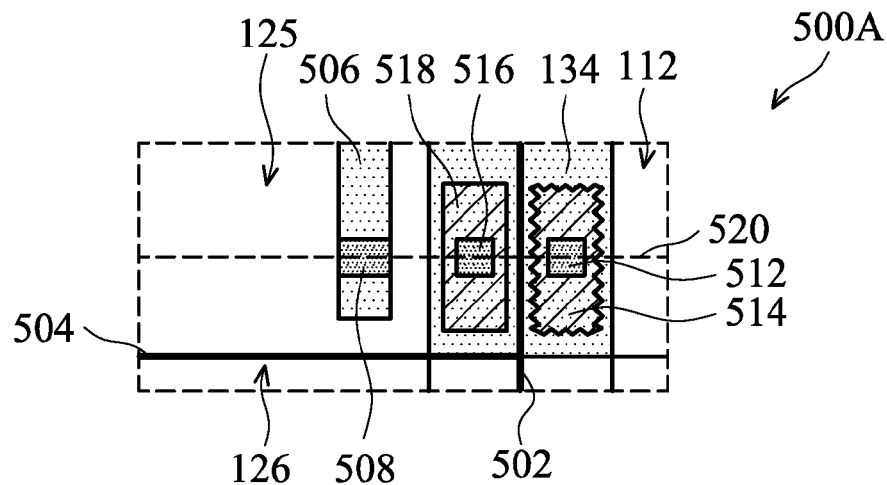

FIG. 5A is an enlarged layout diagram depicting a portion 500A of the original layout design corresponding to region 144 of FIG. 1, rotated by 90 degrees clockwise, in accordance with some embodiments. Components in FIG. 5A that are the same or similar to those in FIG. 1 are given the same reference numbers, and detailed description thereof is thus omitted.

The portion 500A depicts portions of cell layouts 112, 125, and 126, a cell boundary 502 dividing cell layouts 112 and 125 and cell layouts 112 and 126, and a cell boundary 504 dividing cell layouts 125 and 126. Power rail layout pattern 134 extends along cell boundary 502 and having various portions thereof within cell layouts 112, 125, and 126 (i.e., shared by cell layouts 112 and 125 and by cell layouts 112 and 126).

Cell layout 112 includes a via layout pattern 512 and a conductive layout pattern 514. Via layout pattern 512, conductive layout pattern 514, and power rail layout pattern 134 overlap one another. Conductive layout pattern 514 corresponds to forming a MD1 structure of the integrated circuit. Via layout pattern 512 corresponds to forming a via plug in the third via plug layer. Cell layout 125 includes a conductive layout pattern 506, a via layout pattern 508 overlapping conductive layout pattern 514, a via layout pattern 516, and a conductive layout pattern 518. Via layout pattern 516 and conductive layout pattern 518 overlap power rail layout pattern 134. Conductive layout pattern 506 and power rail layout pattern 134 correspond to forming conductive features in the first conductive layer of the integrated circuit. Via layout pattern 508 corresponds to forming a via plug in the second via plug layer. Via layout pattern 516 corresponds to forming a via plug in the third via plug layer. Via layout patterns 512 and 516 are aligned along a reference line 520 perpendicular to cell boundary 502. Conductive layout patterns 514 and 518 are also aligned along reference line 520.

Other details of cell layouts 112, 125, and 126 are omitted. In some embodiments, via layout patterns 508, 512, and 516 have the same dimension.

Figure 5B:
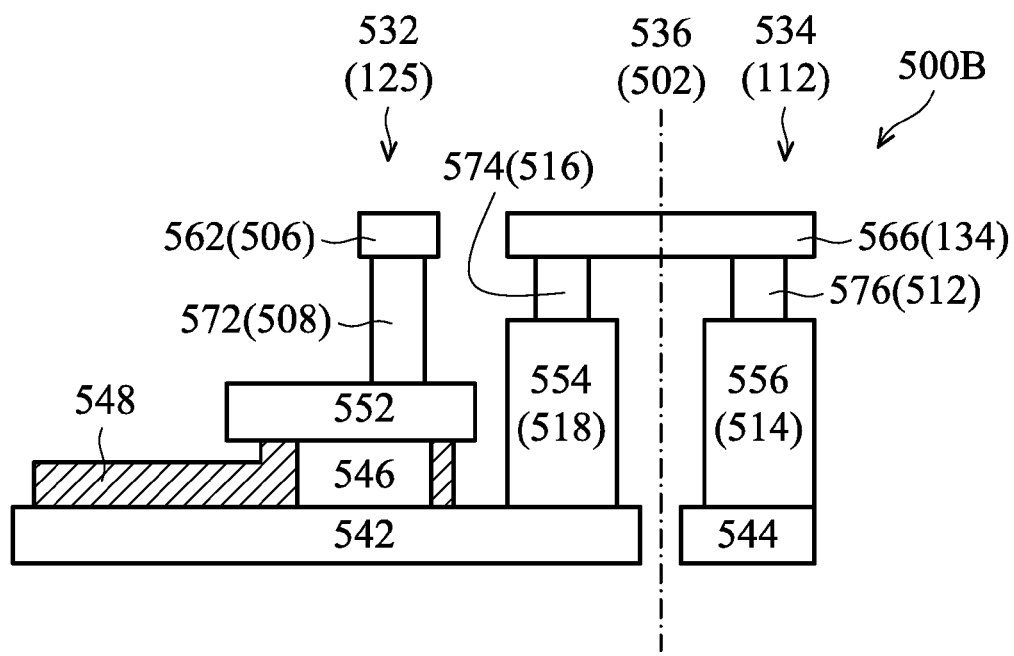

FIG. 5B is a cross-sectional view of a portion 500B of the integrated circuit manufactured based on the original layout design in accordance with some embodiments. The portion 500B is taken along a reference line corresponding to reference line 520 in FIG. 5A. In FIG. 5B, the reference numbers in the parentheses indicate the corresponding counterparts in FIG. 5A. Some details of the portion 400B of the integrated circuit are omitted.

The portion 500B includes a region 532 corresponding to cell layout 125 and a region 534 corresponding to cell layout 112 in FIG. 5A. Reference line 536 indicates the position corresponding to cell boundary 502. The portion 500B includes a first source pad 542 corresponding to source pad 242 in FIG. 2B, a second source pad 544 corresponding to source pad 244, a channel structure 546 corresponding to channel structure 246, a gate structure 548 corresponding to gate structure 248, and a drain pad 552 corresponding to drain pad 252. Detailed description thereof is thus omitted.

The portion 500B further includes a MD1 structure 554 in region 532, a MD1 structure 556 in region 534, and via plugs 572, 574, and 576. MD1 structure 554 is fabricated based on conductive layout pattern 518 in FIG. 5A, and MD1 structure 556 is fabricated based on conductive layout pattern 514. Conductive structure 562 is fabricated based on conductive layout pattern 506, and conductive structure 566 is part of the power rail fabricated based on power rail layout pattern 134. Via plug 572 is fabricated based on via layout pattern 508; via plug 574 is fabricated based on via layout pattern 516; and via plug 576 is fabricated based on via layout pattern 512. Conductive structure 566 is in contact with via plugs 574 and 576 and free from contacting via plug 572.

To accommodate a variety of possible placement or abutment arrangements, layout patterns 512, 514, 516, and 518 are placed away from cell boundary 502 sufficient to guarantee compliance of the minimum spacing layout rule regardless of the possible cell layout on either side of cell boundary 502. As depicted in FIG. 5A and FIG. 5B, cell layouts 112 and 125 are arranged to have the presence of a via layout pattern 512 and conductive layout pattern 514 of cell layout 112 on one side of cell boundary 502 and a via layout pattern 516 and conductive layout pattern 518 of cell layout 125 on the other side of cell boundary 502. Conductive structures 566, 576, 556, 574, and 554 fabricated based on layout patterns 134, 512, 514, 516, and 518 are all electrically coupled with one another. After the placement of cell layouts 112 and 125 is determined, modifying layout patterns 512 or 516 to abut each other or modifying layout patterns 514 or 518 to abut each other does not alter the circuit schematic design. Therefore, in some embodiments, one or more of layout patterns 512, 514, 516, and 518 are merged or resized in order to replace via layout patterns 512 and 516 with an enlarged via layout pattern (such as a via layout pattern 584 in FIG. 5C). The enlarged via layout pattern 584 corresponds to an enlarged via plug (such as a via plug 588 in FIG. 5D) occupying a greater area than that of via plug 574 or via plug 576.

Figure 5C:
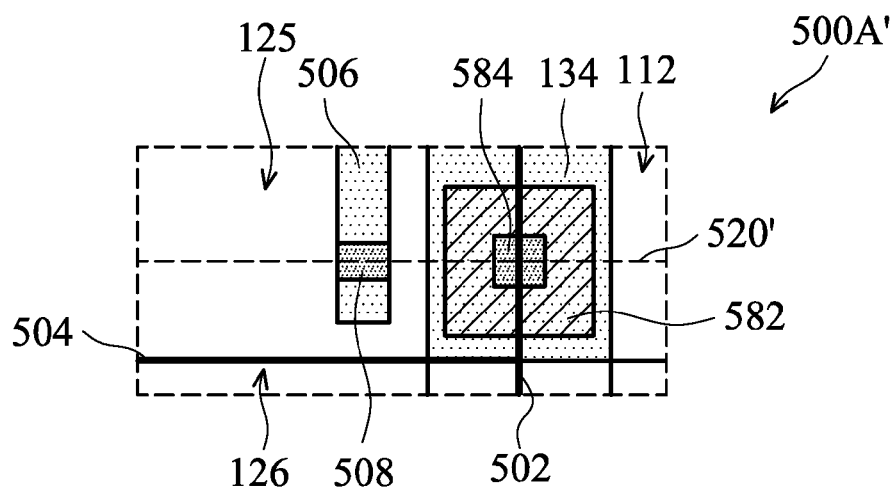

FIG. 5C is a layout diagram of a portion 500A' of the modified layout design based on the scenario depicted in FIG. 5A in accordance with some embodiments. Components in FIG. 5C that are the same or similar to those in FIG. 5A are given the same reference numbers.

Compared with portion 500A in FIG. 5A, conductive layout pattern 514 and layout pattern 518 are replaced with a modified conductive layout pattern 582 in portion 500A'. In some embodiments, modified conductive layout pattern 582 is generated by reshaping or shifting conductive layout pattern 514 and 518 such that each of conductive layout pattern 514 and 518 have an edge shifted toward the cell boundary 502 such that conductive layout pattern 514 and 518 are merged as a layout pattern 582. Also, via layout patterns 512 and 516 are replaced with an enlarged via layout pattern 584. Enlarged via layout pattern 584 overlaps modified conductive layout pattern 582, power rail layout pattern 134, and cell boundary 502. In some embodiments, via layout pattern 584 is grouped with other via layout patterns for forming via plugs in the third via plug layer.

Figure 5D:
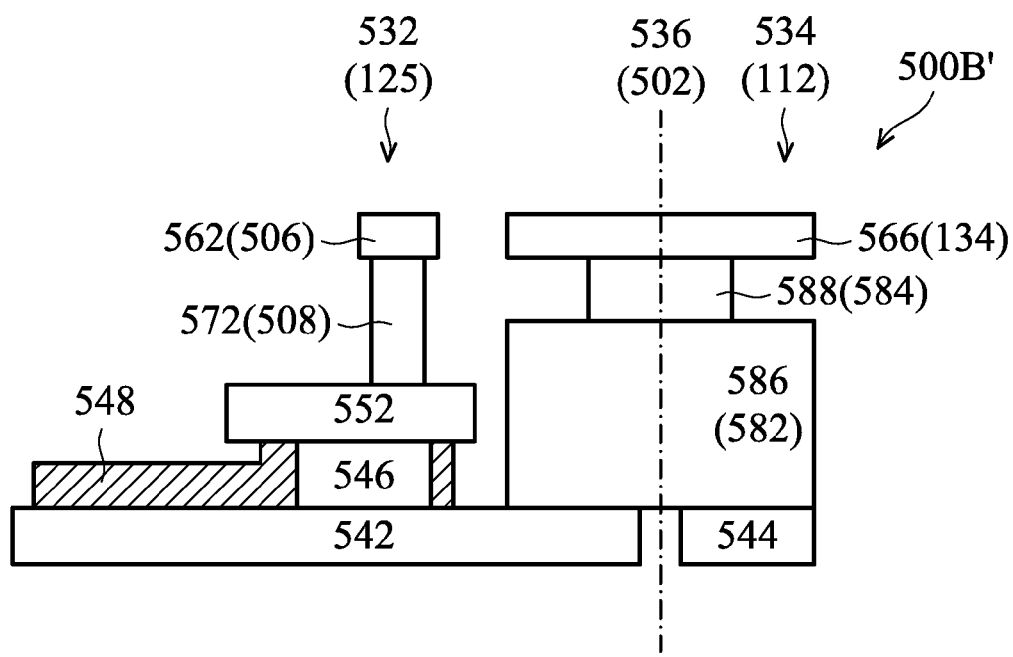

FIG. 5D is a cross-sectional view of a portion 500B' of the integrated circuit manufactured based on the modified layout design. The portion 500B' is taken along a reference line corresponding to reference line 520' in FIG. 5C. In FIG. 5D, the reference numbers in the parentheses indicate the corresponding counterparts in FIG. 5C. Some details of the portion 500B' of the integrated circuit are omitted. Components in FIG. 5D that are the same or similar to those in FIG. 5B are given the same reference numbers.

Compared with portion 500B in FIG. 5B, portion 500B' includes a MD1 structure 586 in place of MD1 structures 554 and 556 and via plug 588 in place of via plugs 574 and 576. MD1 structure 586 is fabricated based on conductive layout pattern 582 in FIG. 5A and is disposed to be in contact with source pads 542 and 544. Via plug 588 is fabricated based on via layout pattern 584 in FIG. 5C and connects MD1 structure 586 with conductive structure 566, which is usable as a portion of a power rail. Conductive structure 566 is free from contacting via plug 572. Also, via plug 588 occupies a greater area than via plug 574 or via plug 576, or a combination of via plugs 574 and 576. As a result, via plug 588 has less electrical resistance along vertical direction Z than that of via plug 574 or via plug 576.

Figure 6A:
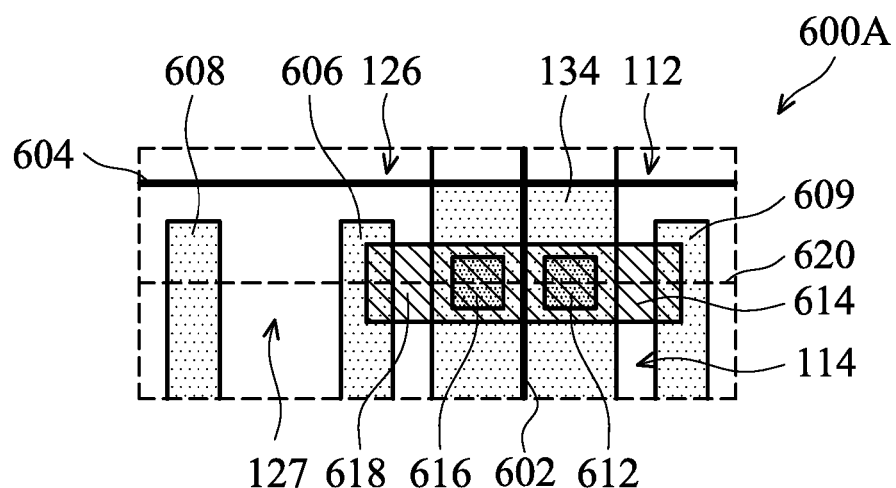

FIG. 6A is an enlarged layout diagram depicting a portion 600A of the original layout design corresponding to region 145 of FIG. 1, rotated by 90 degrees clockwise, in accordance with some embodiments. Components in FIG. 6A that are the same or similar to those in FIG. 1 are given the same reference numbers, and detailed description thereof is thus omitted.

The portion 600A depicts portions of cell layouts 112, 114, 126, and 127, a cell boundary 602 dividing cell layouts 112 and 126 and cell layouts 114 and 127, and a cell boundary 604 dividing cell layouts 112 and 114 and cell layouts 126 and 127. Power rail layout pattern 134 extends along cell boundary 602 and having various portions thereof within cell layouts 112, 114, 126, and 127 (i.e., shared by cell layouts 112 and 126 and by cell layouts 114 and 127).

Cell layout 127 includes conductive layout patterns 606 and 608, a via layout pattern 616, and a conductive layout pattern 618. Cell layout 114 includes a conductive layout pattern 609, a via layout pattern 612, and a conductive layout pattern 614. Via layout pattern 616, conductive layout pattern 618, and power rail layout pattern 134 overlap one another. Via layout pattern 612, conductive layout pattern 614, and power rail layout pattern 134 overlap one another. Conductive layout patterns 614 and 618 contact each other at cell boundary 602. Conductive layout patterns 614 and 618 correspond to forming a MD2 structure of the integrated circuit. Via layout patterns 612 and 616 correspond to forming two corresponding via plugs in the fourth via plug layer. Via layout patterns 612 and 616 are aligned along a reference line 620 perpendicular to cell boundary 602. Conductive layout patterns 614 and 618 are also aligned along reference line 620.

Other details of cell layouts 112, 114, 126, and 127 are omitted. In some embodiments, via layout patterns 612 and 616 have the same dimension.

Figure 6B:
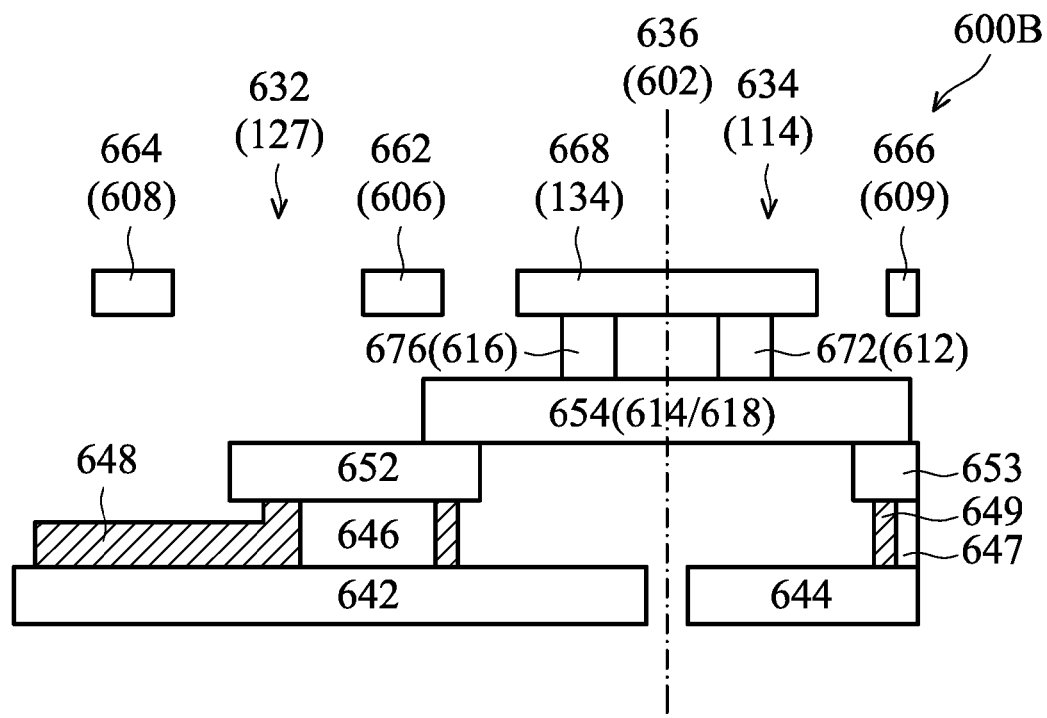

FIG. 6B is a cross-sectional view of a portion 600B of the integrated circuit manufactured based on the original layout design in accordance with some embodiments. The portion 600B is taken along a reference line corresponding to reference line 620 in FIG. 6A. In FIG. 6B, the reference numbers in the parentheses indicate the corresponding counterparts in FIG. 6A. Some details of the portion 600B of the integrated circuit are omitted.

The portion 600B includes a region 632 corresponding to cell layout 127 and a region 634 corresponding to cell layout 114 in FIG. 6A. Reference line 636 indicates the position corresponding to cell boundary 602. The portion 600B includes a first source pad 642 corresponding to source pad 242 in FIG. 2B, a second source pad 644 corresponding to source pad 244, a channel structure 646 in region 632 and a channel structure 647 in region 634 corresponding to channel structure 246, a gate structure 648 in region 632 and a gate structure 649 in region 634 corresponding to gate structure 248, and a drain pad 652 in region 632 and a drain pad 653 in region 634 corresponding to drain pad 252. Detailed description thereof is thus omitted.

The portion 600B further includes a MD2 structure 654 extending through regions 632 and 634, conductive structures 662, 664, 666, and 668, and via plugs 672 and 676. MD2 structure 654 is fabricated based on conductive layout patterns 614 and 618 in FIG. 6A. Conductive structure 662 is fabricated based on conductive layout pattern 606, conductive structure 664 is fabricated based on conductive layout pattern 608, and conductive structure 666 is fabricated based on conductive layout pattern 609. Conductive structure 668 is part of the power rail fabricated based on power rail layout pattern 134. Via plug 672 is fabricated based on via layout pattern 612; and via plug 676 is fabricated based on via layout pattern 616.

To accommodate a variety of possible placement or abutment arrangements, layout patterns 612 and 616 are placed away from cell boundary 602 sufficient to guarantee compliance of the minimum spacing layout rule regardless of the possible cell layout on either side of cell boundary 602. As depicted in FIG. 6A and FIG. 6B, cell layouts 114 and 127 are arranged to have the presence of a via layout pattern 612 and conductive layout pattern 614 of cell layout 114 on one side of cell boundary 602 and a via layout pattern 616 and conductive layout pattern 618 of cell layout 127 on the other side of cell boundary 602. Conductive structures 668, 672, 654, and 676 fabricated based on layout patterns 134, 612, 614, 618, and 616 are all electrically coupled with one another. After the placement of cell layouts 114 and 127 is determined, modifying layout patterns 612 or 616 to abut each other does not alter the circuit schematic design. Therefore, in some embodiments, one or more of layout patterns 612 and 616 are merged or resized in order to replace via layout patterns 612 and 616 with an enlarged via layout pattern (such as a via layout pattern 684 in FIG. 6C). The enlarged via layout pattern 684 corresponds to an enlarged via plug (such as a via plug 688 in FIG. 6D) occupying a greater area than that of via plug 672 or via plug 676.

Figure 6C:
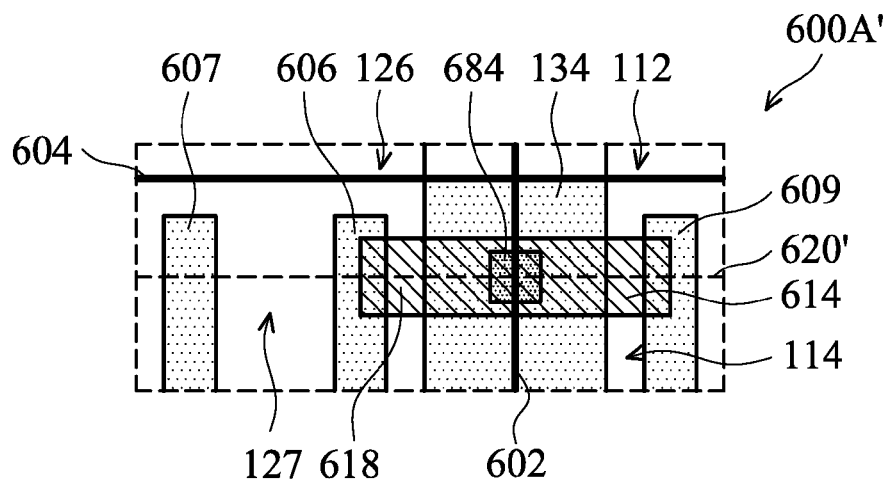

FIG. 6C is a layout diagram of a portion 600A' of the modified layout design based on the scenario depicted in FIG. 6A in accordance with some embodiments. Components in FIG. 6C that are the same or similar to those in FIG. 6A are given the same reference numbers.

Compared with portion 600A in FIG. 6A, via layout patterns 612 and 616 are replaced with an enlarged via layout pattern 684. Enlarged via layout pattern 684 overlaps conductive layout patterns 614 and 618, power rail layout pattern 134, and cell boundary 602. In some embodiments, via layout pattern 684 is grouped with other via layout patterns for forming via plugs in the third via plug layer. In some embodiments, via layout pattern 684 is grouped with other via layout patterns for forming via plugs in the fourth via plug layer.

Figure 6D:
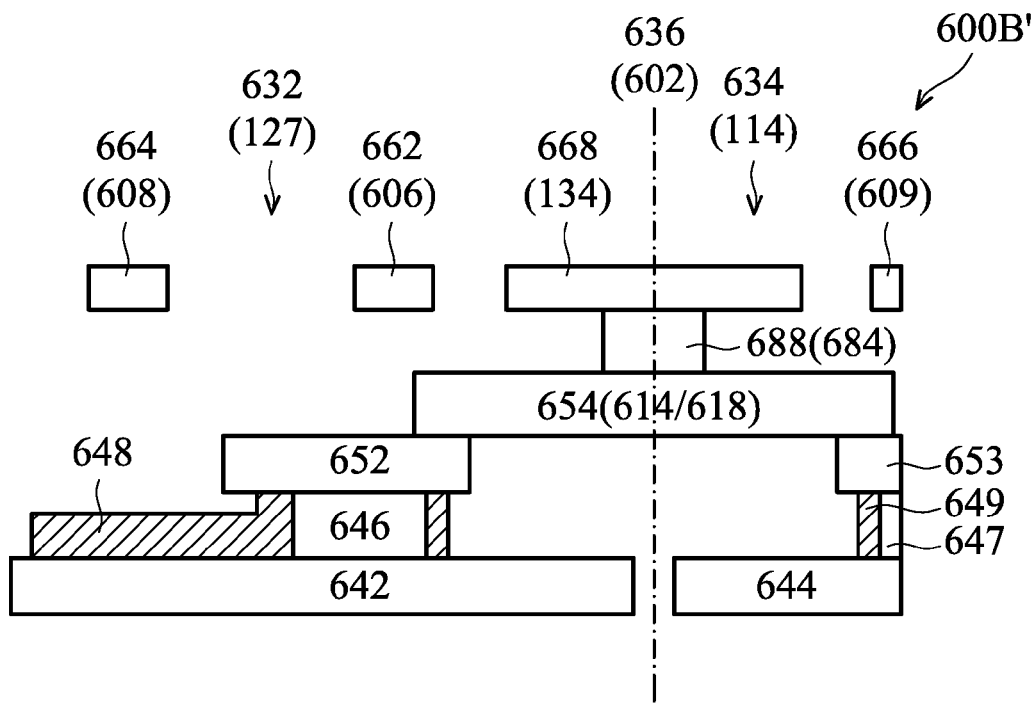

FIG. 6D is a cross-sectional view of a portion 600B' of the integrated circuit manufactured based on the modified layout design. The portion 600B' is taken along a reference line corresponding to reference line 620' in FIG. 6C. In FIG. 6D, the reference numbers in the parentheses indicate the corresponding counterparts in FIG. 6C. Some details of the portion 600B' of the integrated circuit are omitted. Components in FIG. 6D that are the same or similar to those in FIG. 6B are given the same reference numbers.

Compared with portion 600B in FIG. 6B, portion 600B' includes a via plug 688 in place of via plugs 672 and 676. Via plug 688 is fabricated based on via layout pattern 684 in FIG. 6C and connects MD2 structure 654 with conductive structure 668. Also, via plug 688 occupies a greater area than via plug 672 or via plug 676, or a combination of via plugs 672 and 676. As a result, via plug 688 has less electrical resistance along vertical direction Z than that of via plug 672 or via plug 676.

Figure 7C:
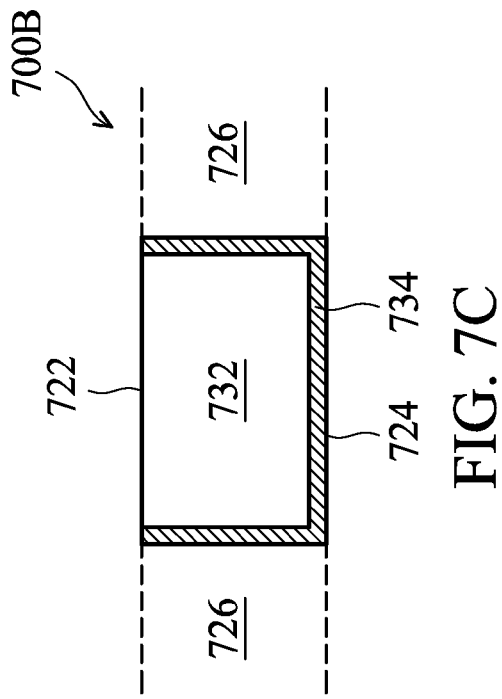
FIGS. 7A and 7C are cross-sectional views of two examples of via plugs having different sizes, in accordance with some embodiments.
Figure 7D:
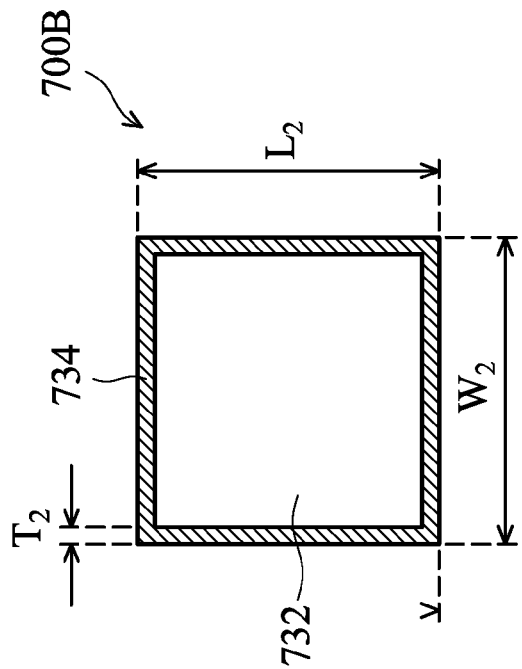
FIGS. 7B and 7D are top views of the example via plugs in FIGS. 7A and 7C, in accordance with some embodiments.
Figure 7A:
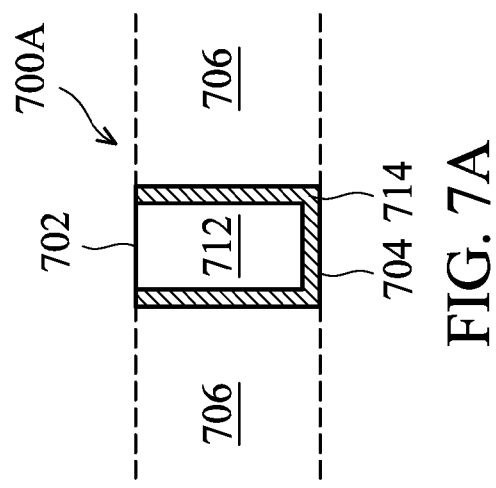

FIG. 7A is a cross-sectional view of an example via plug 700A corresponding to via plugs 276, 376, 472, 476, 574, 576, 672, or 676 in accordance with some embodiments. Via plug 700A includes an upper surface 702 and a lower surface 704 and is surrounded by an interlayer dielectric material structure 706. Upper surface 702 is configured to be in contact with a corresponding conductive feature thereon, such as conductive features 266, 366, 466, 566, or 668. Lower surface 704 is configured to be in contact with a corresponding conductive feature therebelow, such as conductive features 256, 354, 454, 456, 554, 556, or 654.

Via plug 700A further includes a core portion 712 and a barrier layer 714. In some embodiments, core portion 712 includes a material comprising aluminum, copper, tungsten, metal alloy, or other suitable materials. In some embodiments, barrier layer 714 includes a material comprising tantalum nitride, tungsten nitride, titanium nitride, or other suitable materials. In some embodiments, barrier layer 714 has a resistance greater than that of core portion 712.

Figure 7B:
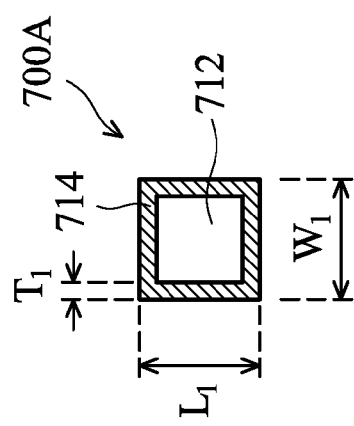

FIG. 7B is a top view of the example via plug 700A in FIG. 7A in accordance with some embodiments. Via plug 700A has a rectangular or square shape having a width $W_1$ and a length $L_1$. In some embodiments, width $W_1$ and length $L_1$ are selected based on a predetermined technology node used for implementing the corresponding layout design. In some embodiments, width $W_1$ or length $L_1$ ranges from 1 nm to 30 nm for manufacturing processes of 7 nm technology node to 20 nm technology node. Barrier layer 714 has a thickness $T_1$ sufficient to prevent the materials in core portion 712 from migrating into the interlayer dielectric material structure 706 (FIG. 7A) or 726 (FIG. 7C). In some embodiments, thickness $T_1$ is less than 15 nm. In some embodiments, thickness $T_1$ ranges from 5 nm to 10 nm. Other numbers of width $W_1$, length $L_1$ and thickness $T_1$ are within the scope of the disclosure. Compared with core portion 712, barrier layer 714 is a high resistivity region. In some embodiments, a smaller thickness $T_1$ leads to smaller resistance of via plug 700A. In some embodiments, the smallest possible thickness of barrier layer 714 is determinable based on process limitations. In some embodiments, via plug 700A has a shape different from a rectangular or square shape.

FIG. 7C is a cross-sectional view of an example via plug 700B corresponding to via plugs 286, 386, 488, 588, or 688 in accordance with some embodiments. Via plug 700B includes an upper surface 722 and a lower surface 724 and is surrounded by an interlayer dielectric material structure 726. Upper surface 722 is configured to be in contact with a corresponding conductive feature thereon, such as conductive features 266, 366, 466, 566, or 668. Lower surface 724 is configured to be in contact with a corresponding conductive feature therebelow, such as conductive features 256, 354, 454, 486, 586, or 654.

Via plug 700B further includes a core portion 732 and a barrier layer 734. Core portion 732 and barrier layer 734 correspond to core portion 702 and barrier layer 704 in FIG. 7A, and detailed description thereof is omitted.

FIG. 7D is a top view of the example via plug 700B in FIG. 7C in accordance with some embodiments. Via plug 700B has a rectangular or square shape having a width $W_2$ and a length $L_2$. In some embodiments, width $W_2$ and length $L_2$ are selected based on a predetermined technology node used for implementing the corresponding layout design. In some embodiments, width $W_2$ or length $L_2$ ranges from 15 nm to 50 nm. In some embodiments, barrier layer 734 has a material similar to that of barrier layer 714 and a thickness $T_2$ having a range overlapping that of thickness $T_1$. Other numbers of width $W_2$, length $L_2$ and thickness $T_2$ are within the scope of the disclosure.

In some embodiments, a ratio of width $W_2$ to width $W_1$ or a ratio of length $L_2$ to length $L_1$ ranges from 1.5 to 1.7. In some embodiments, when the ratio is greater than 1.7, there is insufficient space to accommodate the enlarged via plug 700B without violating the minimum spacing layout rule. In some embodiments, when the ratio is less than 1.5, there is insufficient performance improvement to justify the additional time or computational resources spent on resizing via plug 700A. In some embodiments, a via layout pattern corresponding to via plug 700A has a dimension of 12×12 nm, and a via layout pattern corresponding to enlarged via plug 700B has a dimension of 18×18 nm, 18×20 nm, or 20×20 nm. Other numbers of the ratios and the dimensions of the width and length of an enlarged via plug are within the scope of the disclosure. In some embodiments, a ratio of the area occupied by via plug 700B, or a corresponding enlarged via layout pattern, to the area occupied by via plug 700A, or a corresponding via layout pattern, ranges from 2.25 (1.5× 1.5) to 2.89 (1.7×1.7).

FIG. 8 is a flow chart of a method 800 of forming a set of masks for manufacturing an integrated circuit in accordance with some embodiments. It is understood that additional operations may be performed before, during, and/or after the method 800 depicted in FIG. 8, and that some other processes may only be briefly described herein.

The process begins with operation 810, where an original layout design 812 is obtained. In some embodiments, original layout design 812 is stored in a computer readable, non-transitory storage device. In some embodiments, original layout design 812 is stored in a format compatible with a Graphic Database System (GDS) format or a GDSII format.

The process proceeds to operation 820, where the presence of one or more predetermined layout scenarios in the original layout design 812 is determined. The one or more predetermined layout scenarios include one or more of the scenarios as illustrated in conjunction with FIG. 2A, FIG. 3A, FIG. 4A, FIG. 5A, and/or FIG. 6A.

The process proceeds to operation 830, where the original layout design 812 is modified based on one or more sets of predetermined rules corresponding to the various layout scenarios. The one or more sets of predetermined rules include one or more of the layout pattern modifications as illustrated in conjunction with FIG. 2C, FIG. 3C, FIG. 4C, FIG. 5C, and/or FIG. 6C.

The process proceeds to operation 840, where the original layout design 812 is further modified based on one or more logical operation (LOP) rules and/or optical proximity correction (OPC) rules. The modified original layout design is stored in a computer readable, non-transitory storage device as a modified layout design 842. In some embodiments, modified layout design 842 is stored in a format compatible with a Graphic Database System (GDS) format or a GDSII format.

In some embodiments, operations 810, 820, 830, and 840 are performed by an LOP tool, and operations 820 and 830 are thus performed in conjunction with performing an LOP on the original layout design. In some embodiments, operations 810, 820, 830, and 840 are performed by an OPC tool, and operations 820 and 830 are thus performed in conjunction with performing an OPC on the original layout design. In some embodiments, operations 820 and 830 are performed by executing a software tool different from the LOP tool or the OPC tool.

The process proceeds to operation 850, where a set of masks is formed based on the modified layout design 842. In some embodiments, operation 850 includes performing a coloring process on the modified layout design 842 in order to prepare a set of masks suitable for forming various features as represented by corresponding layout patterns in the modified layout design 842 by a multiple-patterning process.

Figure 9:
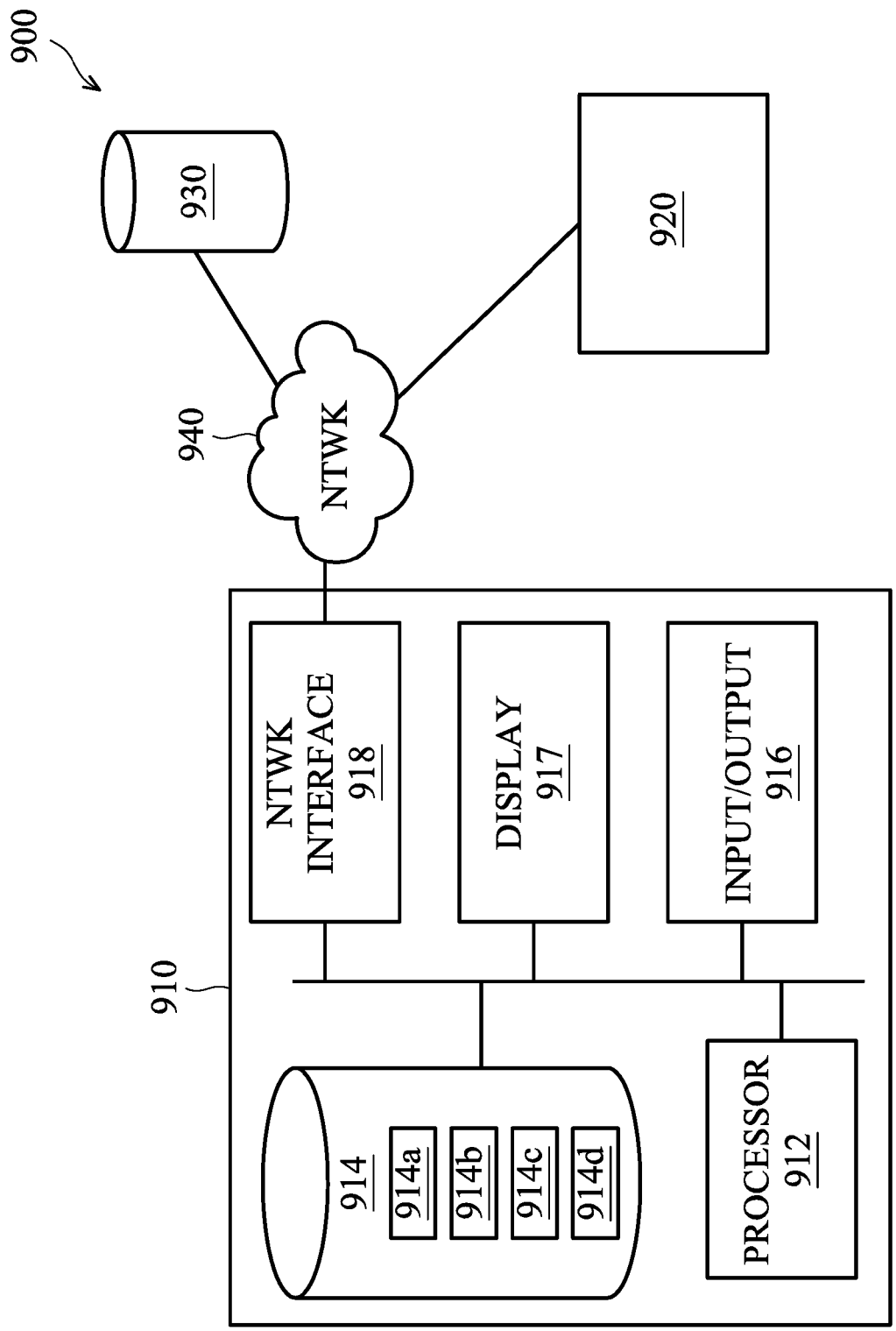
FIG. 9 is a functional block diagram of a system of modifying a layout design usable for forming a set of masks, in accordance with some embodiments.

FIG. 9 is a functional block diagram of a system 900 of modifying a layout design usable for forming a set of masks in accordance with some embodiments. System 900 is usable for implementing one or more operations of the method 800 disclosed in FIG. 8, and further explained in conjunction with FIGS. 1-6B.

System 900 includes a first computer system 910, a second computer system 920, a networked storage device 930, and a network 940 connecting the first computer system 910, the second computer system 920, and the networked storage device 930. In some embodiments, one or more of the second computer system 920, the storage device 930, and the network 940 are omitted.

The first computer system 910 includes a hardware processor 912 communicatively coupled with a non-transitory, computer readable storage medium 914 encoded with, i.e., storing, a set of instructions 914a, an original layout design 914b (such as original layout design 812), any intermediate data 914c for executing the set of instructions 914a, or a modified layout design 914d (such as modified layout design 842). The processor 912 is electrically and communicatively coupled with the computer readable storage medium 914. The processor 912 is configured to execute the set of instructions 914a encoded in the computer readable storage medium 914 in order to cause the computer 910 to be usable as a layout checking tool for performing a method 800 as described in conjunction with FIG. 8 and FIGS. 1-6B.

In some embodiments, the set of instructions 914a, the layout design 914b, the intermediate data 914c, or the modified layout design 914d are stored in a non-transitory storage medium other than storage medium 914. In some embodiments, some or all of the set of instructions 914a, the layout design 914b, the intermediate data 914c, or the modified layout design 914d are stored in a non-transitory storage medium in networked storage device 930 or second computer system 920. In such case, some or all of the set of instructions 914a, the layout design 914b, the intermediate data 914c, or the modified layout design 914d stored outside computer 910 is accessible by the processor 912 through the network 940.

In some embodiments, the processor 912 is a central processing unit (CPU), a multi-processor, a distributed processing system, an application specific integrated circuit (ASIC), and/or a suitable processing unit.

In some embodiments, the computer readable storage medium 914 is an electronic, magnetic, optical, electromagnetic, infrared, and/or a semiconductor system (or apparatus or device). For example, the computer readable storage medium 914 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 914 includes a compact disk-read only memory (CD-ROM), a compact disk-read/write (CD-R/W), and/or a digital video disc (DVD).

The computer system 910 includes, in at least some embodiments, an input/output interface 916 and a display unit 917. The input/output interface 916 is coupled to the processor 912 and allows the circuit designer to manipulate the first computer system 910. In at least some embodiments, the display unit 917 displays the status of executing the set of instructions 914a and, in at least some embodiments, provides a Graphical User Interface (GUI). In at least some embodiments, the display unit 917 displays the status of executing the set of instructions 914*a* in a real time manner. In at least some embodiments, the input/output interface 916 and the display 917 allow an operator to operate the computer system 910 in an interactive manner.

In at least some embodiments, the computer system 900 also includes a network interface 918 coupled to the processor 912. The network interface 918 allows the computer system 910 to communicate with the network 940, to which one or more other computer systems are connected. The network interface includes wireless network interfaces such as BLUETOOTH, WIFI, WIMAX, GPRS, or WCDMA; or wired network interface such as ETHERNET, USB, or IEEE-1394.

In accordance with one embodiment, a method of forming a set of masks for manufacturing an integrated circuit includes determining presence of a first via layout pattern and a power rail layout pattern in an original layout design. The first via layout pattern and the power rail layout pattern overlap each other. The first via layout pattern is part of a first cell layout of the original layout design. The power rail layout pattern is shared by the first cell layout and a second cell layout of the original layout design and extending along a cell boundary between the first cell layout and the second cell layout. The first via layout pattern corresponds to a first via plug layer of the integrated circuit, and the shared power rail layout pattern corresponds to a first conductive layer of the integrated circuit above the first via plug layer. The method further includes modifying the original layout design to become a modified layout design and forming the set of masks based on the modified layout design. The modifying the original layout design includes, if the first via layout pattern and the power rail are present in the original layout design, replacing the first via layout pattern with an enlarged via layout pattern. The enlarged via layout pattern occupies an area greater than that occupied by the first via layout pattern.

In accordance with another embodiment, a method of forming a set of masks for manufacturing an integrated circuit includes determining presence of a first conductive layout pattern, a first via layout pattern overlapping the first conductive layout pattern, a second conductive layout pattern, a second via layout pattern overlapping the second conductive layout pattern, and a power rail layout pattern in an original layout design. The power rail layout pattern overlaps the first conductive layout pattern, the first via layout pattern, the second conductive layout pattern, and the second via layout pattern. The first via layout pattern and the first conductive layout pattern are part of a first cell layout of the original layout design. The second via layout pattern and the second conductive layout pattern are part of a second cell layout of the original layout design. The power rail layout pattern is shared by the first cell layout and the second cell layout and extending along a cell boundary between the first cell layout and the second cell layout. The first conductive layout pattern and the second conductive layout pattern are aligned along a direction perpendicular to the cell boundary between the first cell layout and the second cell layout. The method further includes modifying the original layout design to become a modified layout design; and forming the set of masks based on the modified layout design. The modifying the original layout design includes, if the first conductive layout pattern, the first via layout pattern, the second conductive layout pattern, the second via layout pattern, and the power rail layout pattern are present in the original layout design, performing at least one of the following: replacing the first conductive layout pattern with a modified first conductive layout pattern, the modified first conductive layout pattern abutting the second conductive layout pattern; replacing the second conductive layout pattern with a modified second conductive layout pattern, the modified second conductive layout pattern abutting the first conductive layout pattern; or replacing the first conductive layout pattern and the second conductive layout pattern with a merged conductive layout pattern overlapping areas occupied by the first conductive layout pattern and the second conductive layout pattern.

In accordance with another embodiment, an integrated circuit includes a first via plug layer over a first cell area and a second cell area, and a first conductive layer above the first via plug layer. The first via plug layer includes a first via plug overlapping a reference boundary where the first cell area and the second cell area abut each other; and a second via plug within the first cell area. The first via plug occupies an area greater than that occupied by the second via plug. The first conductive layer includes a power rail overlapping and extending along the reference boundary, the power rail contacting the first via plug and free from contacting the second via plug.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming a set of masks for manufacturing an integrated circuit, the method comprising:
    determining a presence of a first via layout pattern and a power rail layout pattern in an original layout design, the first via layout pattern and the power rail layout pattern overlapping each other, the first via layout pattern being part of a first cell layout of the original layout design, the power rail layout pattern being shared by the first cell layout and a second cell layout of the original layout design and extending along a cell boundary between the first cell layout and the second cell layout, the first via layout pattern corresponding to a first via plug layer of the integrated circuit, and the shared power rail layout pattern corresponding to a first conductive layer of the integrated circuit above the first via plug layer; and
    identifying a pre-defined relationship between the first cell layout, the power rail layout and the second cell layout;
    in response to identifying the pre-defined relationship, generating a modified layout design by replacing the first via layout pattern with an enlarged via layout pattern, the enlarged via layout pattern occupying an area greater than that occupied by the first via layout pattern; and
    forming the set of masks based on the modified layout design.

2. The method of claim 1, further comprising:
    determining a presence of a second via layout pattern in the original layout design, the second via layout pattern and the power rail layout pattern overlapping each other, the second via layout pattern being part of the second cell layout; and in response to identifying the pre-defined relationship, replacing the second via layout pattern with the enlarged via layout pattern, the enlarged via layout pattern overlapping the cell boundary between the first cell layout and the second cell layout.

3. The method of claim 2, wherein
the first cell layout of the original layout design further comprises a first conductive layout pattern corresponding to a second conductive layer of the integrated circuit, the second conductive layer being below the first via plug layer;
the second cell layout of the original layout design further comprises a second conductive layout pattern corresponding to the second conductive layer of the integrated circuit; and
the modifying the original layout design further comprises:
generating a merged conductive layout pattern based on the first conductive layout pattern and the second conductive layout pattern, the merged conductive layout pattern corresponding to the second conductive layer; and
replacing the first conductive layout pattern and the second conductive layout pattern with the merged conductive layout pattern, the enlarged via layout pattern overlapping the merged conductive layout pattern.

4. The method of claim 2, wherein
the first cell layout of the original layout design further comprises a first conductive layout pattern corresponding to a second conductive layer of the integrated circuit, the second conductive layer being below the first via plug layer;
the second cell layout of the original layout design further comprises a second conductive layout pattern corresponding to a third conductive layer of the integrated circuit, the third conductive layer being below the first via plug layer, the second conductive layer and the third conductive layer having different thicknesses; and
the modifying the original layout design further comprises:
generating a modified first conductive layout pattern based on the first conductive layout pattern, the modified first conductive layout pattern corresponding to the second conductive layer, and the enlarged via layout pattern overlapping the modified first conductive layout pattern and the second conductive layout pattern; and
replacing the first conductive layout pattern with the modified first conductive layout pattern.

5. The method of claim 4, wherein generating the modified first conductive layout pattern comprises reshaping or shifting the first conductive layout pattern such that an edge of the modified first conductive layout pattern, in comparison with a corresponding edge of the first conductive layout pattern, is shifted toward the cell boundary between the first cell layout and the second cell layout.

6. The method of claim 2, wherein
the first cell layout of the original layout design further comprises a first conductive layout pattern corresponding to a second conductive layer of the integrated circuit, the second conductive layer being below the first via plug layer;
the second cell layout of the original layout design further comprises a second conductive layout pattern corresponding to a third conductive layer of the integrated circuit, the third conductive layer being below the first via plug layer, the second conductive layer and the third conductive layer having different thicknesses; and
the modifying the original layout design further comprises:
generating a modified first conductive layout pattern based on the first conductive layout pattern, the modified first conductive layout pattern corresponding to the second conductive layer, and the enlarged via layout pattern overlapping the modified first conductive layout pattern;
generating a modified second conductive layout pattern based on the second conductive layout pattern, the modified second conductive layout pattern corresponding to the third conductive layer, and the enlarged via layout pattern overlapping the modified second conductive layout pattern;
replacing the first conductive layout pattern with the modified first conductive layout pattern; and
replacing the second conductive layout pattern with the modified second conductive layout pattern.

7. The method of claim 1, wherein replacing the first via layout pattern with an enlarged via layout pattern comprises applying a ratio of the area occupied by the enlarged via layout pattern to the area occupied by the first via layout pattern based on at least one of a minimum performance improvement or a minimum spacing layout rule.

8. The method of claim 7, wherein the ratio ranges from 2.25 to 2.89.

9. A method of forming a set of masks for manufacturing an integrated circuit, the method comprising:
determining a presence of a first conductive layout pattern, a first via layout pattern overlapping the first conductive layout pattern, a second conductive layout pattern, a second via layout pattern overlapping the second conductive layout pattern, and a power rail layout pattern in an original layout design, the power rail layout pattern overlapping the first conductive layout pattern, the first via layout pattern, the second conductive layout pattern, and the second via layout pattern, the first via layout pattern and the first conductive layout pattern being part of a first cell layout of the original layout design, the second via layout pattern and the second conductive layout pattern being part of a second cell layout of the original layout design, the power rail layout pattern being shared by the first cell layout and the second cell layout and extending along a cell boundary between the first cell layout and the second cell layout, the first conductive layout pattern and the second conductive layout pattern being aligned along a direction perpendicular to the cell boundary between the first cell layout and the second cell layout;
modifying the original layout design to result in a modified layout design, comprising:
identifying in the original layout design a known relationship between the first conductive layout pattern, the first via layout pattern, the second conductive layout pattern, the second via layout pattern, and the power rail layout pattern, and in response to the identifying, performing at least one of the following:
replacing the first conductive layout pattern with a modified first conductive layout pattern, the modified first conductive layout pattern abutting the second conductive layout pattern;

replacing the second conductive layout pattern with a modified second conductive layout pattern, the modified second conductive layout pattern abutting the first conductive layout pattern; or replacing the first conductive layout pattern and the second conductive layout pattern with a merged conductive layout pattern overlapping areas occupied by the first conductive layout pattern and the second conductive layout pattern; and forming the set of masks based on the modified layout design.

10. The method of claim 9, wherein modifying the original layout design further comprises:

replacing the first via layout pattern and the second via layout pattern with an enlarged via layout pattern, the enlarged via layout pattern overlapping the cell boundary between the first cell layout and the second cell layout and overlapping at least one of the following:

the modified first conductive layout pattern and the second conductive layout pattern;

the modified second conductive layout pattern and the first conductive layout pattern; or the merged conductive layout pattern.

11. The method of claim 9, wherein the first conductive layout pattern corresponding to a second conductive layer of the integrated circuit, the second conductive layer being below the first via plug layer; and the second conductive layout pattern corresponding to the second conductive layer of the integrated circuit.

12. The method of claim 9, wherein the first conductive layout pattern corresponding to a second conductive layer of the integrated circuit, the second conductive layer being below the first via plug layer; and the second conductive layout pattern corresponding to a third conductive layer of the integrated circuit, the third conductive layer being below the first via plug layer, the second conductive layer and the third conductive layer having different thicknesses.

13. The method of claim 9, further comprising:

determining a presence of a third via layout pattern in the original layout design, the third via layout pattern and the power rail layout pattern overlapping each other, the third via layout pattern being part of the first cell layout of the original layout design, the second cell layout of the original layout design having no via layout that overlaps the power rail layout pattern and corresponds to the third via layout pattern, wherein modifying the original layout design to result in the modified layout design further comprises:

identifying in the original layout design a known relationship between the third via layout pattern and the power rail layout pattern and in response thereto, replacing the third via layout pattern with an enlarged via layout pattern, the enlarged via layout pattern occupying an area greater than that occupied by the third via layout pattern.

14. The method of claim 10, wherein replacing the first via layout pattern and the second via layout pattern with the enlarged via layout pattern comprises applying a ratio of an area occupied by the enlarged via layout pattern to an area occupied by the first via layout pattern and the second via layout pattern based on at least one of a minimum performance improvement or a minimum spacing layout rule.

15. The method of claim 14, wherein the ratio ranges from 2.25 to 2.89.

16. A method comprising:

identifying in an integrated circuit layout, a cell boundary;

identifying in the integrated circuit layout a modification condition that includes a power rail layout pattern that overlaps the cell boundary and that overlaps a via layout pattern in a first cell bordered by the cell boundary, the via layout pattern being a predetermined distance from the cell boundary;

in response to identifying the modification condition, generating a revised integrated circuit layout having a revised via layout pattern, the revised via layout pattern extending closer to the cell boundary than the via layout pattern; and generating a photomask using the revised via layout pattern.

17. The method of claim 16, further comprising patterning a layer of conductor on a semiconductor substrate using the photomask.

18. The method of claim 16, further comprising: identifying in the integrated circuit layout (a) a first conductive line layout pattern and a second via layout pattern in the first cell and overlapped by the power rail layout pattern, and (b) a second conductive line layout pattern and a third via layout pattern in a second cell bordered by the cell boundary and overlapped by the power rail layout pattern; and generating a revised layout pattern for the first conductive line layout pattern, the second conductive line layout pattern, or both, wherein the revised layout pattern extends across the cell boundary.

19. The method of claim 18, wherein generating the revised layout pattern includes replacing the first conductive layout pattern and the second conductive layout pattern with a merged conductive layout pattern overlapping areas occupied by the first conductive layout pattern and the second conductive layout pattern.

20. The method of claim 18, wherein the revised via layout pattern is revised to extend across the cell boundary.

* * * * *